(12) United States Patent
Mehta et al.

(10) Patent No.: US 11,230,435 B1
(45) Date of Patent: Jan. 25, 2022

(54) MULTI-ASIN CONSOLIDATION AND TRANSPORTATION SYSTEM

(71) Applicant: Amazon Technologies, Inc., Seattle, WA (US)

(72) Inventors: Vatsal Mehta, Renton, WA (US); Max Alfonso Bruccoleri, Seattle, WA (US); Maxim P. Hoffman, Bothell, WA (US); Chad Clifford Horton, Bonney Lake, WA (US)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 16/712,866

(22) Filed: Dec. 12, 2019

(51) Int. Cl.
  *B65G 1/137* (2006.01)
  *B65G 1/04* (2006.01)

(52) U.S. Cl.
  CPC ......... *B65G 1/1371* (2013.01); *B65G 1/0492* (2013.01); *B65G 1/1373* (2013.01)

(58) Field of Classification Search
  CPC combination set(s) only.
  See application file for complete search history.

(56) References Cited

U.S. PATENT DOCUMENTS

| | | |
|---|---|---|
| 5,423,431 A | 6/1995 | Westin |
| 5,460,271 A | 10/1995 | Kenny et al. |
| 5,638,938 A | 6/1997 | Lazzarotti et al. |
| 5,788,053 A | 8/1998 | Glawitsch |
| 5,950,800 A | 9/1999 | Terrell et al. |
| 6,259,967 B1 | 7/2001 | Hartlepp et al. |
| 6,609,607 B2 | 8/2003 | Woltjer et al. |
| 7,012,210 B2* | 3/2006 | Kibbler ..................... B07C 1/02 198/444 |
| 8,280,547 B2 | 10/2012 | D'Andrea et al. |
| 9,087,314 B2 | 7/2015 | Hoffman et al. |
| 9,452,883 B1* | 9/2016 | Wurman .............. G05D 1/0287 |
| 9,580,245 B2 | 2/2017 | Mansfield et al. |
| 9,630,784 B2 | 4/2017 | Ragan |
| 9,738,449 B1* | 8/2017 | Palamarchuk ......... B65G 1/137 |
| 10,278,095 B1 | 4/2019 | Kothari et al. |
| 10,315,859 B1 | 6/2019 | Zhao et al. |
| 2011/0103924 A1* | 5/2011 | Watt ....................... B65G 65/00 414/331.13 |
| 2013/0246229 A1* | 9/2013 | Mountz .................. G08C 17/02 705/28 |
| 2016/0060037 A1* | 3/2016 | Razumov ............. B65G 1/1378 700/216 |
| 2016/0236869 A1* | 8/2016 | Kimura ................ G05D 1/0291 |

(Continued)

OTHER PUBLICATIONS

U.S. Appl. No. 16/712,848, U.S. Patent Application, "Consolidation and Transportation of Items," filed Dec. 12, 2019.

(Continued)

*Primary Examiner* — Kyle O Logan
(74) *Attorney, Agent, or Firm* — Kilpatrick Townsend & Stockton LLP

(57) ABSTRACT

Mobile sorting units for sorting and moving items within an inventory system. The can include a moveable structure for receiving and sorting items onto shelves and moving the items to item storage locations. The moveable structure can include a moveable platform for receiving the items and positioning the items for transportation to storage containers.

20 Claims, 10 Drawing Sheets

(56) References Cited

U.S. PATENT DOCUMENTS

2017/0174431 A1* 6/2017 Borders ............... B65G 1/0421
2017/0362036 A1   12/2017 Hartmann et al.
2019/0276236 A1*  9/2019 Wu ...................... B65G 1/0407
2019/0352092 A1* 11/2019 Zheng .................. B65G 1/0435
2020/0398916 A1* 12/2020 Finke ................... B65G 65/00

OTHER PUBLICATIONS

U.S. Appl. No. 16/688,780, U.S. Patent Application, "Inventory Sorting and Transport," filed Nov. 19, 2019.

* cited by examiner

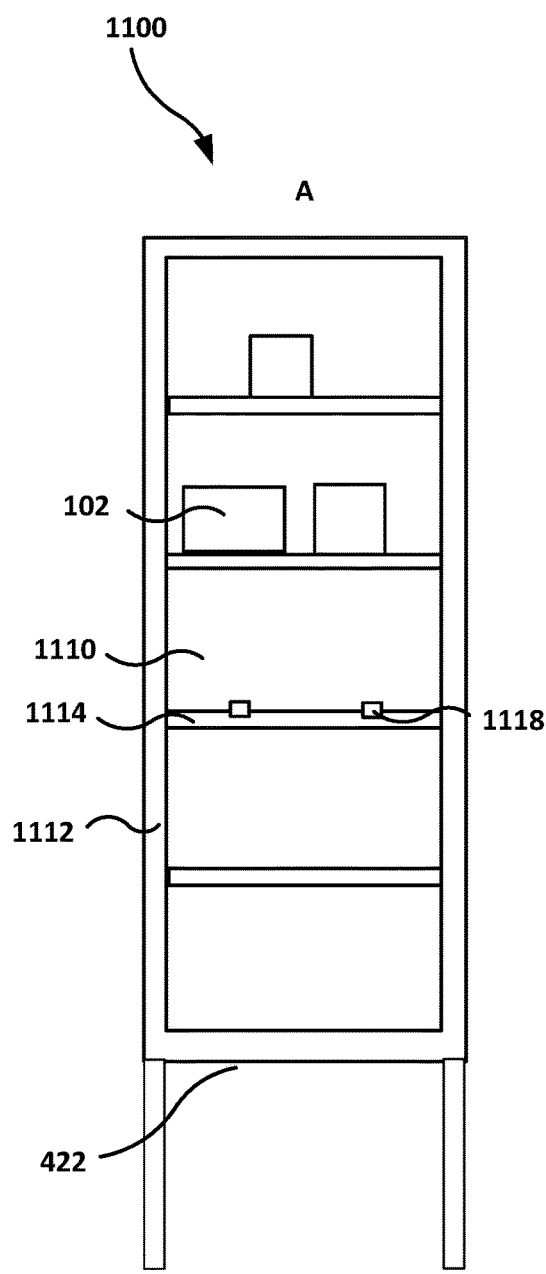
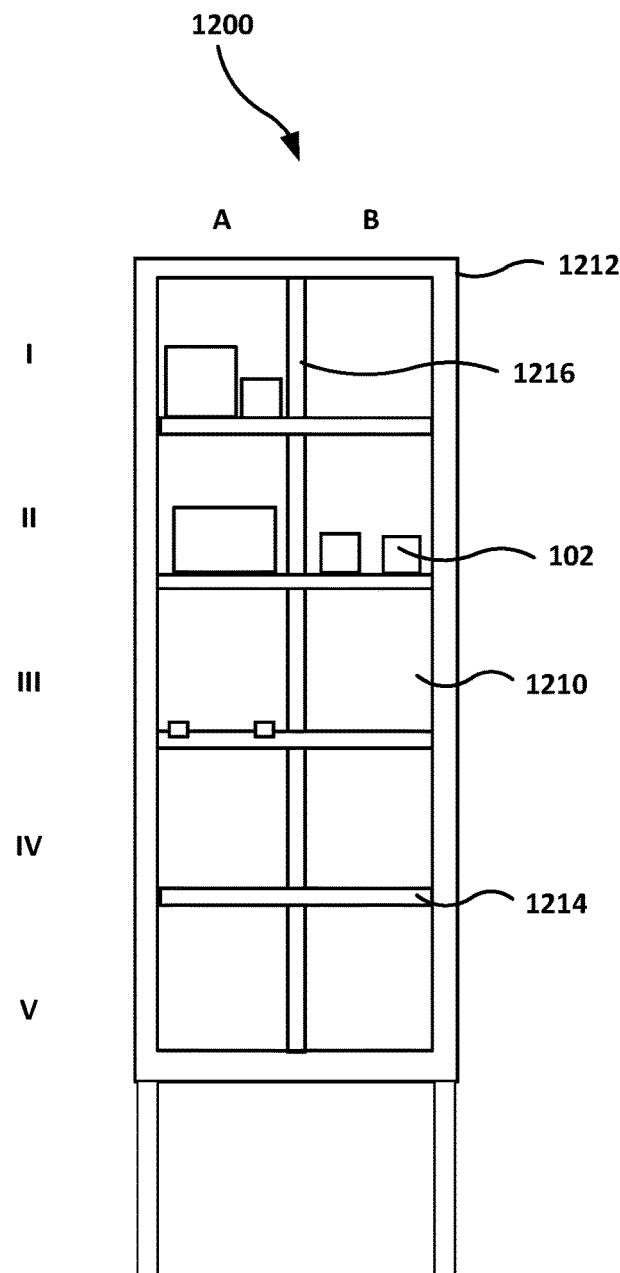
FIG. 11
FIG. 12

MULTI-ASIN CONSOLIDATION AND TRANSPORTATION SYSTEM

CROSS-REFERENCE TO RELATED APPLICATIONS

This application is related to and incorporates by reference for all purposes the full disclosure of U.S. Pat. No. 10,315,859, granted on Jun. 11, 2019, titled "AUTOMATIC SINGULATION OF ITEMS".

BACKGROUND

Modern inventory systems, such as those in mail order warehouses, supply chain distribution centers, airport luggage systems, and custom-order manufacturing facilities, face significant challenges in responding to requests for items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which:

FIGS. 11 and 12 illustrate an example storage container that may be utilized in particular embodiments of the inventory sorting system of FIG. 1;

DETAILED DESCRIPTION

Figure 1:
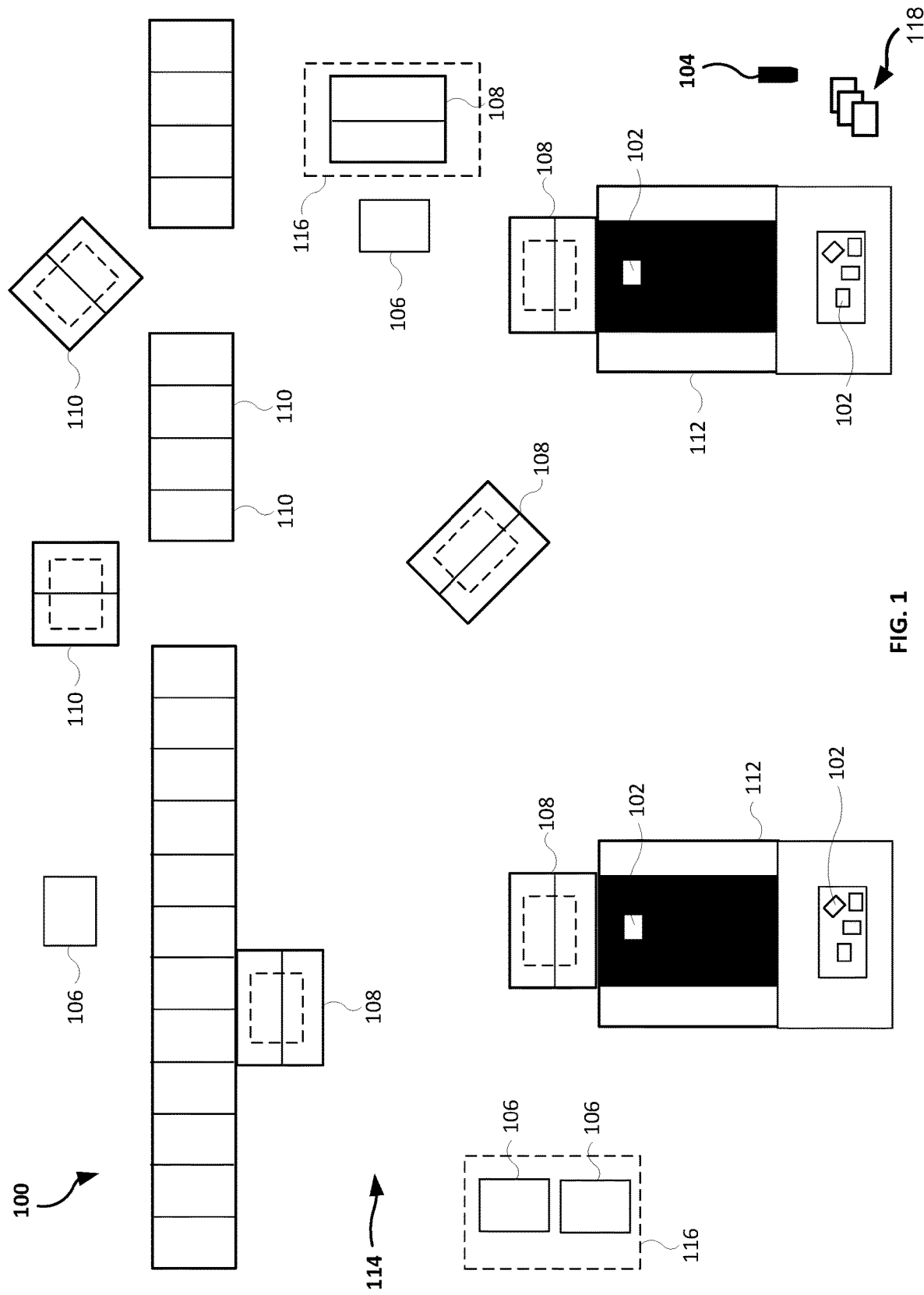
FIG. 1 is a top view of a simplified layout of an inventory sorting system for sorting and transporting items.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory sorting system for sorting and transporting items. In various embodiments, the inventory system includes mobiles sorters for sorting items into individual orders and transporting items to inventory holders. The mobile sorters can receive one or more items from an item singulation system and position the items at one of many sorting shelves in mobile sorter. In some embodiments, the sorting device positions the item at the sorting shelf based on order data associated with an online order received from a purchaser. For example, the purchaser can place an online order for multiple items and the mobile sorter can positions the items associated with the order at a single sorting shelf. The mobile sorters can position the items at sorting shelves and transport the items to one or more inventory holders. In various embodiments, the mobile sorters are moveable around a warehouse environment and can be positioned adjacent to the item singulation device to receive items and adjacent to the inventory holders to deliver items. The mobile sorter can be repositioned, to deliver items to multiple inventory holders. The inventory holders can be moved around the warehouse environment. For example, the inventory holders can be moved to one or more packaging stations for packing of one or more items into shipping containers based on the order data associated with the purchaser. For example, one or more items ordered by a purchaser can be positioned in a single inventory holder and can be packaged together in a single shipping container.

As an illustrative example, an order can be received from an online purchaser. The order may contain multiple items, for example, cookies, makeup, and rechargeable batteries. In response to the order being received, the purchased items can be located in a storage area, for example, a warehouse environment, and collected. Additional items not associated with the order may be collected before the items are transported to an item singulation device. Additionally or alternatively, only some of the items associated with the order may be collected and transported to the item singulation device with the remaining items collected and transported in a separate action. The items from the order can be separated and fed one by one to a mobile sorter. The mobile sorter positions the items at sorting shelves based on order data associated with the items. For example, the cookies, makeup, and rechargeable batteries may be received by a mobile sorter at various times but will be transported to the same sorting shelf for grouping. The items can be transported to the sorting shelf based on the order data and/or on item data associated with the item. The mobile sorter can move the items to a position for transferring the items to an inventory holder. The inventory holder can receive items in one or more item cubbies. For example, the cookies, makeup, and rechargeable batteries can be transferred from the mobile sort device to a single item cubby. The inventory holder can be moved around the warehouse environment for further processing of the items. For example, the cookies, makeup, and rechargeable batteries can be moved to a packing station for packing of the items into a package.

Referring now to the drawings in which similar identifiers refer to similar elements, FIG. 1 is a top view of a simplified layout of an inventory sorting system 100 for sorting and transporting items 102. The inventory sorting system 100 can include a management module 104, one or more mobile drive units 106, one or more mobile sorters 108, one or more inventory holders 110, and one or more item singulation stations 112. The mobile sorters 108 can receive items 102 and position them at sorting shelves in the mobile sorters based on order data associated with the items. The mobile drive units 106 can move the mobile sorters 108 between points within a workspace 114 in response to commands communicated by management module 104. For example, the mobile drive units 106 can position the mobile sorters 108 next to one or more of the inventory holders 110. The inventory holders 110 can receive one or more items 102 from the mobile sorters 108. Each inventory holder 110 can store one or more types of items 102. In many embodiments, the inventory holders 110 can be moved by the mobile drive units 106. For example, a full or semi-full inventory holder 110 can be moved by a mobile drive unit 106 and replaced by an empty inventory holder 110. As a result, the inventory sorting system 100 is capable of moving items 102 between locations within workspace 114 to facilitate the entry, processing, and/or removal of items 102 from inventory sorting system 100 and the completion of other tasks involving items 102.

Management module 104 can assigns tasks to appropriate components of inventory sorting system 100 and coordinate operation of the various components in completing the tasks. These tasks may relate not only to the movement and processing of items 102, but also to the management and maintenance of the components of inventory sorting system 100. For example, management module 104 may assign portions of workspace 114 as parking spaces 116 for mobile drive units 106, schedule recharge or replacement of mobile drive unit batteries, designate empty mobile sorters 108 or inventory holders 110, or any other operations associated with the functionality supported by inventory sorting system 100 and its various components.

Management module 104 may select components of inventory sorting system 100 to perform these tasks and communicate appropriate commands and/or data to the selected components to facilitate completion of these operations. Although shown in FIG. 1 as a single, discrete component, management module 104 may represent multiple components and may represent or include portions of mobile drive units 106 or other elements of inventory sorting system 100. As a result, any or all of the interactions between a particular mobile drive unit 106 and management module 104 that are described below may, in particular embodiments, represent peer-to-peer communication between that mobile drive unit 106 and one or more other mobile drive units 106. The components and operation of an example embodiment of management module 104 are discussed further below with respect to FIG. 2.

Mobile drive units 106 can move mobile sorters 108 or inventory holders 110 between locations within workspace 114. Mobile drive units 106 may represent any devices or components appropriate for use in inventory sorting system 100 based on the characteristics and configuration of mobile sorters 108 and/or other elements of inventory sorting system 100. In a particular embodiment of the inventory sorting system 100, mobile drive units 106 represent independent, self-powered devices configured to freely move about workspace 114. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING ITEMS", the entire disclosures of which are herein incorporated by reference. In alternative embodiments, the mobile drive units 106 represent elements of a tracked inventory system configured to move the mobile sorters 108 and/or inventory holders 110 along tracks, rails, cables, crane system, or other guidance or support elements traversing workspace 114. In such an embodiment, the mobile drive units 106 may receive power and/or support through a connection to the guidance elements, such as a powered rail. Additionally, in particular embodiments of inventory sorting system 100 the mobile drive units 106 may be configured to utilize alternative conveyance equipment to move within workspace 114 and/or between separate portions of workspace 114. The components and operation of an example embodiment of a mobile drive unit 106 are discussed further below with respect to FIGS. 11 and 12.

Additionally, mobile drive units 106 may be capable of communicating with management module 104 to receive information identifying selected mobile sorters 108 and/or inventory holders 110, transmit the locations of mobile drive units 106, or exchange any other suitable information to be used by management module 104 or mobile drive units 106 during operation. Mobile drive units 106 may communicate with management module 104 wirelessly, using wired connections between mobile drive units 106 and management module 104, and/or in any other appropriate manner. As one example, particular embodiments of mobile drive unit 106 may communicate with management module 104 and/or with one another using 802.11, Bluetooth, or Infrared Data Association (IrDA) standards, or any other appropriate wireless communication protocol. As another example, in a tracked inventory sorting system 100, tracks or other guidance elements upon which mobile drive units 106 move may be wired to facilitate communication between mobile drive units 106 and other components of inventory sorting system 100. Furthermore, as noted above, management module 104 may include components of individual mobile drive units 106. Thus, for the purposes of this description and the claims that follow, communication between management module 104 and a particular mobile drive unit 106 may represent communication between components of a particular mobile drive unit 106. In general, mobile drive units 106 may be powered, propelled, and controlled in any manner appropriate based on the configuration and characteristics of inventory sorting system 100.

Item singulation stations 112 can receive multiple items 102 and output the items one at a time. In many embodiments, multiple items 102 can be positioned in a tote and the tote can be fed into an item singulation station 112. The items 102 can be removed from the tote and fed to a mobile sorter 108 one at a time. The item singulation stations 112 can include conveyors or motor driven rollers for conveying the items 102 to the mobile sorters 108. Examples of mobile sorters 108 are disclosed in U.S. Pat. No. 10,315,859, granted on Jun. 11, 2019, titled "AUTOMATIC SINGULATION OF ITEMS", the entire disclosures of which are herein incorporated by reference.

Mobile sorters 108 can position items 102 at a storage location, for example, based on order data associated with the items. The mobile sorter 108 can receive an item 102 on a platform moveable up and down along a height of the mobile sorter. The platform can move the item 102 along the height and position the item for transferring to the storage location. The storage location can receive the item 102 from the platform. In many embodiments, the platform and/or one or more of the storage locations can include a transfer device for movement of items 102. The mobile sorters 108 can be moved around the workspace 114 to a position for delivering one or more items 102 to inventory holders 110. For example, one or more items 102 contained in a sort position can be transferred from a mobile sorter 108 to an inventory holder 110. Mobile sorters 108 and/or inventory holders 110 are capable of being carried, rolled, and/or otherwise moved by mobile drive units 106. In particular embodiments, mobile sorters 108 and/or inventory holders 110 may provide additional propulsion to supplement that provided by mobile drive unit 106 when moving the inventory holders 110. In some embodiments, the mobile sorter 108 can include the mobile drive unit 106. The mobile drive unit 106 can be attached to the mobile sorter 108 to move the mobile sorter 108 around the workspace 114. For example, the mobile 108 can be built directly on top of the mobile drive unit 106. Additionally or alternatively, the mobile sorter 108 can include an internal drive for moving the mobile sorter. The internal drive unit can be or include an electric drivetrain, a motor, or any propulsion system suitable for moving the mobile sorter 108. In further embodiments, the mobile drive unit 106 can engage with another mobile drive unit 106 to provide additional propulsion to the mobile sorter 108.

In many embodiments, mobile sorters 108 can include shelves for receiving items 102. For example, the mobile sorters 108 can include shelves defining one or more sorting shelves for receiving items 102. The shelves can be positioned in a shelving unit with multiple shelves defining multiple sorting shelves.

The inventory holders 110 can receive and store items 102. In particular embodiments, inventory holders 110 can include multiple item cubbies with each item cubby capable of holding one or more types of items 102. Additionally, in particular embodiments, items 102 may also hang from hooks or bars (not shown) within or on inventory holders 110. In general, inventory holders 110 may store items 102 in any appropriate manner within inventory holders 110 and/or on the external surface of inventory holders 110.

Additionally, one or more of the inventory holders 110 can have one or more faces. The item cubbies may be accessible through one or more faces of the inventory holders 110. For example, in a particular embodiment, inventory holders 110 includes four faces. In such an embodiment, the item cubbies may be accessible through two of the four faces with the other two faces being supporting sidewalls. The mobile drive unit 106 may be configured to rotate inventory holders 110 at appropriate times to present a particular face and the bins associated with that face to a mobile sorter 108 or other components of inventory sorting system 100.

Items 102 represent any objects suitable for storage, retrieval, and/or processing in an automated inventory sorting system 100. For the purposes of this description, "items 102" may represent any one or more objects of a particular type that are stored in inventory sorting system 100. Thus, a particular inventory holder 110 is currently "storing" a particular inventory item if the inventory holder 110 currently holds one or more units of that type. As one example, inventory sorting system 100 may represent a mail order warehouse facility, and items 102 may represent merchandise stored in the warehouse facility. During operation, mobile drive units 106 may position mobile sorters 108 to receive one or more items 102 and move the mobile sorters 108 adjacent to inventory holders 110 to transfer the items.

Workspace 114 represents an area associated with inventory sorting system 100 in which mobile drive units 106 can move and/or mobile sorters 108 can be moved and operated. For example, workspace 114 may represent all or part of the floor of a mail-order warehouse in which inventory sorting system 100 operates. Although FIG. 1 shows, for the purposes of illustration, an embodiment of inventory sorting system 100 in which workspace 114 includes a fixed, predetermined, and finite physical space, particular embodiments of inventory sorting system 100 may include mobile drive units 106 and mobile sorters 108 that are configured to operate within a workspace 114 that is of variable dimensions and/or an arbitrary geometry. While FIG. 1 illustrates a particular embodiment of inventory sorting system 100 in which workspace 114 is entirely enclosed in a building, alternative embodiments may utilize workspaces 114 in which some or all of the workspace 114 is located outdoors, within a vehicle (such as a cargo ship), or otherwise unconstrained by any fixed structure.

In operation, management module 104 selects appropriate components to complete particular tasks and transmits task assignments 118 to the selected components to trigger completion of the relevant tasks. Each task assignment 118 defines one or more tasks to be completed by a particular component. These tasks may relate to the retrieval, storage, replenishment, and counting of items 102 and/or the management of mobile drive units 106, one or more mobile sorters 108, one or more inventory holders 110, and one or more item singulation stations 112 and other components of inventory sorting system 100. Depending on the component and the task to be completed, a particular task assignment 118 may identify locations, components, and/or actions associated with the corresponding task and/or any other appropriate information to be used by the relevant component in completing the assigned task.

In particular embodiments, management module 104 generates task assignments 118 based, in part, on inventory requests that management module 104 receives from other components of inventory sorting system 100 and/or from external components in communication with management module 104. These inventory requests identify particular operations to be completed involving items 102 stored or to be stored within inventory sorting system 100 and may represent communication of any suitable form. For example, in particular embodiments, an inventory request may represent a shipping order specifying particular items 102 that have been purchased by a customer and that are to be retrieved from inventory sorting system 100 for shipment to the customer. Management module 104 may also generate task assignments 118 independently of such inventory requests, as part of the overall management and maintenance of inventory sorting system 100. For example, management module 104 may generate task assignments 118 in response to the occurrence of a particular event (e.g., in response to a mobile drive unit 106 requesting a space to park), according to a predetermined schedule (e.g., as part of a daily start-up routine), or at any appropriate time based on the configuration and characteristics of inventory sorting system 100. After generating one or more task assignments 18, management module 104 transmits the generated task assignments 18 to appropriate components for completion of the corresponding task. The relevant components then execute their assigned tasks.

With respect to mobile drive units 106 specifically, management module 104 may, in particular embodiments, communicate task assignments 118 to selected mobile drive units 106 that identify one or more destinations for the selected mobile drive units 106. Management module 104 may select a mobile drive unit 106 to assign the relevant task based on the location or state of the selected mobile drive unit 106, an indication that the selected mobile drive unit 106 has completed a previously-assigned task, a predetermined schedule, and/or any other suitable consideration. These destinations may be associated with an inventory request the management module 104 is executing or a management objective the management module 104 is attempting to fulfill. For example, the task assignment may define a storage location for an item 102 in the mobile sorter 108, an item singulation station 112 to be visited, a cubby location in an inventory holder 110, a parking space 116 where the mobile drive unit 106 should park until receiving another task, or a location associated with any other task appropriate based on the configuration, characteristics, and/or state of inventory sorting system 100, as a whole, or individual components of inventory sorting system 100. For example, in particular embodiments, such decisions may be based on the popularity of particular items 102, the priority designation of a particular item, the cubby location of an item in an inventory holder 110, the tasks currently assigned to a particular mobile drive unit 106, and/or any other appropriate considerations.

As part of completing these tasks mobile drive units 106 may dock with and transport the mobile sorters 108 and/or inventory holders 110 within workspace 114. Mobile drive units 106 may dock with the mobile sorters 108 and/or inventory holders 110 by connecting to, lifting, and/or otherwise interacting with the mobile sorters 108 and/or inventory holders 110 in any other suitable manner so that, when docked, mobile drive units 106 are coupled to and/or support mobile sorters 108 and/or inventory holders 110 and can move mobile sorters 108 and/or inventory holders 110 within workspace 114. While the description below focuses on particular embodiments of mobile drive unit 106, the mobile sorters 108 and/or inventory holders 110 that are configured to dock in a particular manner, alternative embodiments of mobile drive unit 106 mobile sorters 108 and/or inventory holders 110 may be configured to dock in any manner suitable to allow mobile drive unit 106 to move mobile sorters 108 and/or inventory holders 110 within workspace 114. Additionally, as noted below, in particular embodiments, mobile drive units 106 represent all or portions of mobile sorters 108. In such embodiments, mobile drive units 106 may not dock with mobile sorters 108 before transporting mobile sorters 108 and/or mobile drive units 106 may each remain continually docked with a particular mobile sorter 108 and/or inventory holder 110.

While the appropriate components of inventory sorting system 100 complete assigned tasks, management module 104 may interact with the relevant components to ensure the efficient use of space, equipment, manpower, and other resources available to inventory sorting system 100. As one specific example of such interaction, management module 104 is responsible, in particular embodiments, for planning the paths mobile drive units 106 take when moving within workspace 114 and for allocating use of a particular portion of workspace 114 to a particular mobile drive unit 106 for purposes of completing an assigned task. In such embodiments, mobile drive units 106 may, in response to being assigned a task, request a path to a particular destination associated with the task. Moreover, while the description below focuses on one or more embodiments in which mobile drive unit 106 requests paths from management module 104, mobile drive unit 106 may, in alternative embodiments, generate its own paths.

Components of inventory sorting system 100 may provide information to management module 104 regarding their current state, other components of inventory sorting system 100 with which they are interacting, and/or other conditions relevant to the operation of inventory sorting system 100. This may allow management module 104 to utilize feedback from the relevant components to update algorithm parameters, adjust policies, or otherwise modify its decision-making to respond to changes in operating conditions or the occurrence of particular events.

In addition, while management module 104 may be configured to manage various aspects of the operation of the components of inventory sorting system 100, in particular embodiments, the components themselves may also be responsible for decision-making relating to certain aspects of their operation, thereby reducing the processing load on management module 104.

Thus, based on its knowledge of the location, current state, and/or other characteristics of the various components of inventory sorting system 100 and an awareness of all the tasks currently being completed, management module 104 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory sorting system 100 may be able to support a number of techniques for efficiently executing various aspects of the operation of inventory sorting system 100. As a result, particular embodiments of management module 104 may, by implementing one or more management techniques described below, enhance the efficiency of inventory sorting system 100 and/or provide other operational benefits.

Figure 2:
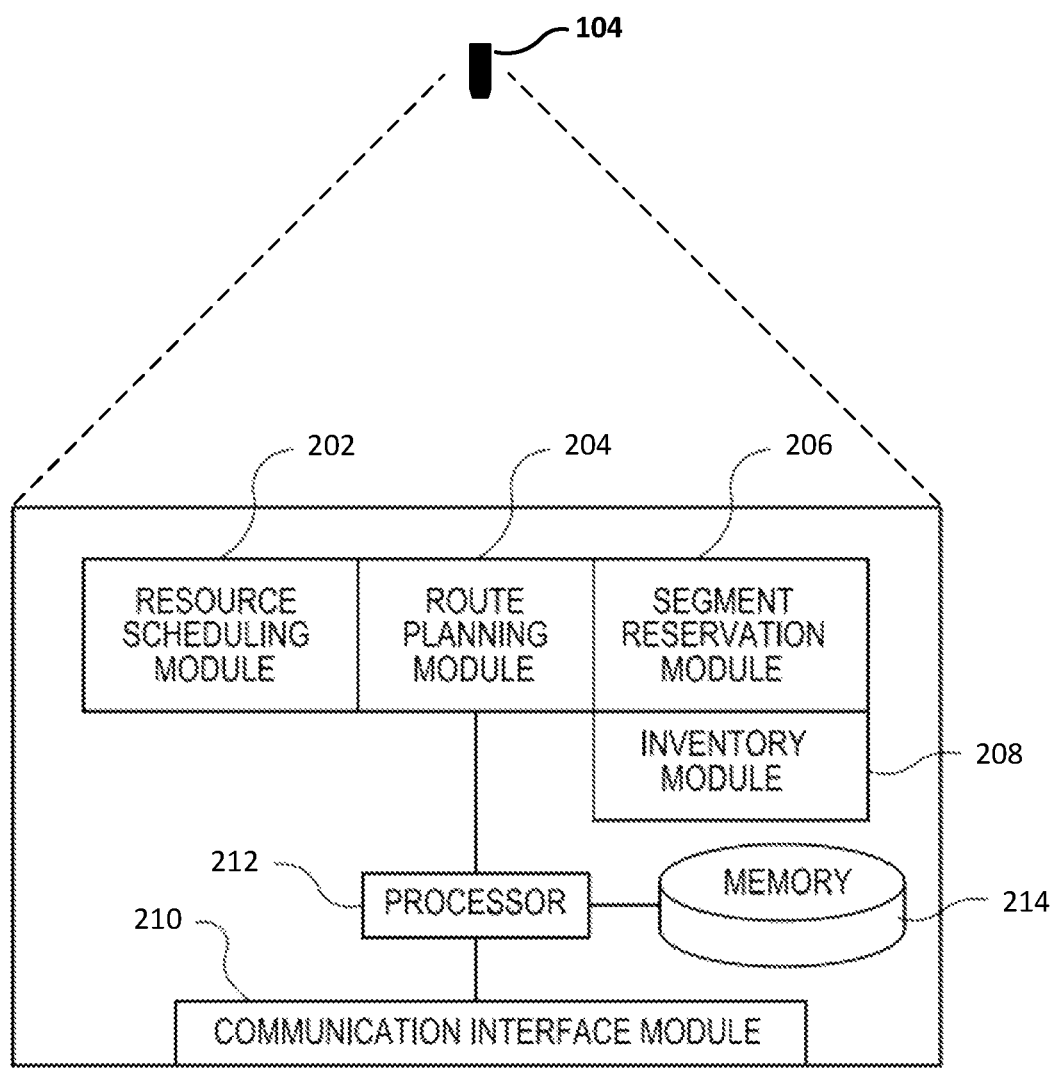
FIG. 2 illustrates in greater detail the components of an example management module that may be utilized in particular embodiments of the inventory sorting system of FIG. 1.

Turning to FIG. 2, a particular embodiment of management module 104 is shown in greater detail that may be utilized in particular embodiments of the system or architecture shown in FIG. 1. As shown, the example embodiment includes a resource scheduling module 202, a route planning module 204, a segment reservation module 206, an inventory module 208, a communication interface module 210, a processor 212, and a memory 214. Management module 104 may represent a single component, multiple components located at a central location within inventory sorting system 100, or multiple components distributed throughout inventory sorting system 100. For example, management module 104 may represent components of one or more mobile drive units 106 that are capable of communicating information between the mobile drive units 106 and coordinating the movement of mobile drive units 106 within workspace 114. In general, management module 104 may include any appropriate combination of hardware and/or software suitable to provide the described functionality.

Processor 212 is operable to execute instructions associated with the functionality provided by management module 104. Processor 212 may comprise one or more general purpose computers, dedicated microprocessors, or other processing devices capable of communicating electronic information. Examples of processor 212 include one or more application-specific integrated circuits (ASICs), field programmable gate arrays (FPGAs), digital signal processors (DSPs) and any other suitable specific or general purpose processors.

Memory 214 stores processor instructions, inventory requests, reservation information, state information for the various components of inventory sorting system 100 and/or any other appropriate values, parameters, or information utilized by management module 104 during operation. Memory 214 may represent any collection and arrangement of volatile or nonvolatile, local or remote devices suitable for storing data. Examples of memory 214 include, but are not limited to, random access memory (RAM) devices, read only memory (ROM) devices, magnetic storage devices, optical storage devices or any other suitable data storage devices.

Resource scheduling module 202 processes received inventory requests and generates one or more assigned tasks to be completed by the components of inventory sorting system 100. Resource scheduling module 202 may also select one or more appropriate components for completing the assigned tasks and, using communication interface module 210, communicate the assigned tasks to the relevant components. Additionally, resource scheduling module 202 may also be responsible for generating assigned tasks associated with various management operations, such as prompting mobile drive units 106 to recharge batteries or have batteries replaced, instructing inactive mobile drive units 106 to park in a location outside the anticipated traffic flow or a location near the anticipated site of future tasks, and/or directing mobile drive units 106 selected for repair or maintenance to move towards a designated maintenance station.

Route planning module 204 receives route requests from mobile drive units 106. These route requests identify one or more destinations associated with a task the requesting mobile drive unit 106 is executing. In response to receiving a route request, route planning module 204 generates a path to one or more destinations identified in the route request. Route planning module 204 may implement any appropriate algorithms utilizing any appropriate parameters, factors, and/or considerations to determine the appropriate path. After generating an appropriate path, route planning module 204 transmits a route response identifying the generated path to the requesting mobile drive unit 106 using communication interface module 210.

Segment reservation module 206 receives reservation requests from mobile drive units 106 attempting to move along paths generated by route planning module 204. These reservation requests request the use of a particular portion of workspace 114 (referred to herein as a "segment") to allow the requesting mobile drive unit 106 to avoid collisions with other mobile drive units 106 while moving across the reserved segment. In response to received reservation requests, segment reservation module 206 transmits a reservation response granting or denying the reservation request to the requesting mobile drive unit 106 using the communication interface module 210.

The inventory module 208 maintains information about the location and number of items 102 in the inventory sorting system 100. Information can be maintained about the number of items 102 in a particular inventory holder 110 and/or the number of items in a particular mobile sorter 108, and the maintained information can include the location of those items 102 in the inventory holder 110. The inventory module 208 can also communicate with the mobile drive units 106, utilizing task assignments 118 to maintain, replenish or move items 102 within the inventory sorting system 100.

Communication interface module 210 facilitates communication between management module 104 and other components of inventory sorting system 100, including reservation responses, reservation requests, route requests, route responses, and task assignments. These reservation responses, reservation requests, route requests, route responses, and task assignments may represent communication of any form appropriate based on the capabilities of management module 104 and may include any suitable information. Depending on the configuration of management module 104, communication interface module 210 may be responsible for facilitating either or both of wired and wireless communication between management module 104 and the various components of inventory sorting system 100. In particular embodiments, management module 104 may communicate using communication protocols such as 802.11, Bluetooth, or Infrared Data Association (IrDA) standards. Furthermore, management module 104 may, in particular embodiments, represent a portion of mobile drive unit 106 or other components of inventory sorting system 100. In such embodiments, communication interface module 210 may facilitate communication between management module 104 and other parts of the same system component.

In general, resource scheduling module 202, route planning module 204, segment reservation module 206, inventory module 208, and communication interface module 210 may each represent any appropriate hardware and/or software suitable to provide the described functionality. In addition, as noted above, management module 104 may, in particular embodiments, represent multiple different discrete components and any or all of resource scheduling module 202, route planning module 204, segment reservation module 206, inventory module 208, and communication interface module 210 may represent components physically separate from the remaining elements of management module 104. Moreover, any two or more of resource scheduling module 202, route planning module 204, segment reservation module 206, inventory module 208, and communication interface module 210 may share common components. For example, in particular embodiments, resource scheduling module 202, route planning module 204, segment reservation module 206, and inventory module 208 represent computer processes executing on processor 212 and communication interface module 210 comprises a wireless transmitter, a wireless receiver, and a related computer process executing on processor 212.

Figure 3:
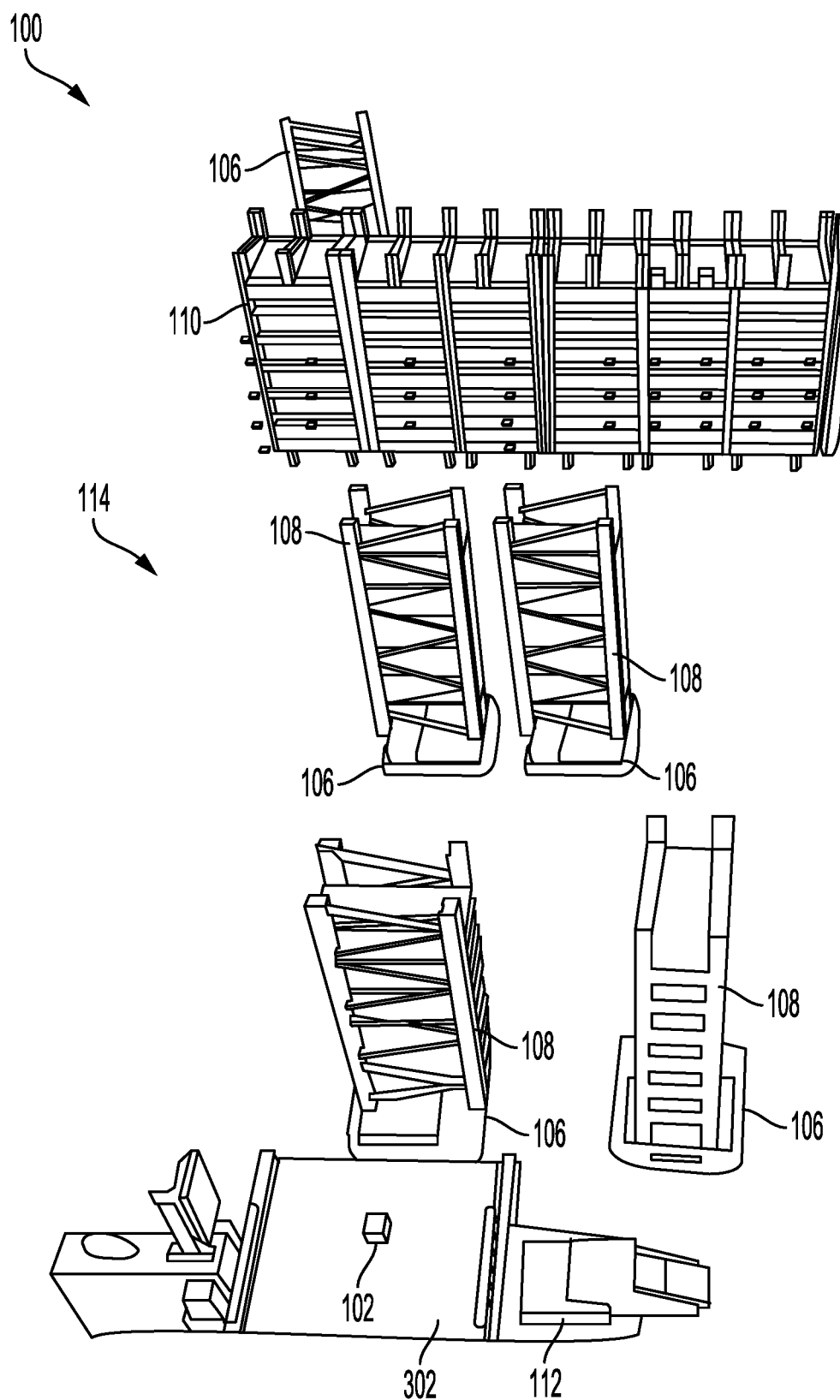
FIG. 3 is a detailed illustration of example components that may be utilized in particular embodiments of the inventory sorting system of FIG. 1.

Turning now to FIG. 3, a detailed illustration of example components that may be utilized in particular embodiments of the inventory sorting system 100 of FIG. 1 is shown. The inventory sorting system 100 includes an item singulation station 112, mobile drive units 106, mobile sorters 108, and inventory holders 110. The item singulation station 112 can receive one or more items 102 associated with an order and transport the items one at a time to one or more mobile sorters 108. In many embodiments, the item singulation station 112 can receive multiple items 102 in a tote. The item singulation station 112 can empty the items 102 from the tote and deposit them one at a time onto a conveyance mechanism 302. The conveyance mechanism 302 can transport items 102 to a position for transferring of the items to the mobile sorters 108. For example, the conveyance mechanism 302 can transport the items 102 to the end of the conveyance mechanism. In many embodiments, the conveyance mechanism 302 can be or include rollers, motor driven rollers, a conveyor, a mechanical pusher, a rigid chain, or any device suitable for conveying items 102 to a position for transferring to the mobile sorter 108. Additionally or alternatively, the conveyance mechanism 302 can be positioned to transfer items 102 to the mobile sorter 108 via a sloped surface. The sloped surfaces may include gates or similar devices for regulating when items 102 are transferred to the mobile sorter 108.

In some embodiments, the item singulation station 112 can transfer the items 102 to a single mobile sorter 108. However, the item singulation station 112 may transfer the items 102 to multiple mobile sorters 108 simultaneously. For example, multiple mobile sorters 108 can be positioned at the end of the conveyance mechanism 302 and each can receive items 102. In further embodiments, the item singulation station 112 can include multiple positions for transferring of the items 102 to the mobile sorters 108, with each of these positions able to transfer items 102 to one or more mobile sorters 108. For example, three mobile sorters 108 can be distributed evenly to three transfer positions, all three can be positioned at a single transfer position, or the mobile sorters can be unevenly distributed to the three transfer positions.

The items 102 can be positioned at the end of the conveyance mechanism to transfer the items 102 to one or more mobile sorters 108. In some embodiments, the conveyance mechanism may be a multi-directional conveyance mechanism that can move items 102 to various locations for transfer to mobile sorters 108. For example, the conveyance mechanism may move items 102 to designated locations based on the items size, shape, weight, and/or priority designation.

The mobile sorters 108 can be positioned adjacent to the conveyance mechanism 302 to receive items 102. In many embodiments, the mobile sorters 108 can be positioned using mobile drive units 106 and/or a propulsion system. The mobile sorter 108 can receive the items 102 one at a time or can receive multiple items at the same time. The mobile sorters 108 can receive the items 102 and position the items at a sorting shelf on the mobile sorters 108. For example, the mobile sorters 108 can receive the items 102 on a platform and move the items up or down to the sorting shelf. In various embodiments, the sorting shelves can be stacked vertically. The sorting shelf can be based at least partially on order data associated with the item 102. In many embodiments, the sorting shelf can be or include a shelf and/or an item cubby. The mobile sorters 108 can receive items 102 from one or more item singulation stations 112 and/or items can be positioned directly on the mobile sorters 108.

In some embodiments, the sorting shelf and/or the platform can include a conveyance mechanism for transferring of the items 102. For example, the sorting shelf and/or the platform can include a conveyor and/or motor driven rollers for positioning the items 102.

The mobile drive units 106 can engage with and move the mobile sorters 108. The mobile drive units 106 can be positioned beneath the mobile sorters 108 and engage with a mounting plate. The mobile drive units 106 can pick the mobile sorters 108 off the ground and move the mobile sorters around the workspace 114. For example, one or more items 102 can be positioned on the mobile sorters 108 and the mobile sorters can be moved around the workspace 114. The mobile sorters 108 can be moved next to one or more inventory holders 110. In some embodiments, the mobile sorters 108 may be moved to an additional item singulation station 112 and/or a designated area in the workspace 114.

The mobile sorters 108 can transfer one or more items 102 into item cubbies positioned in the inventory holders 110. The items 102 can be transferred from the sorting shelves in the mobile sorters 108 to corresponding item cubbies in the inventory holders 110. For example, seven sorting shelves may be stacked vertically corresponding to seven vertically stacked cubbies in an inventory holder 110. The inventory holders 110 can include one or more columns of item cubbies. Multiple inventory holders 110 can be positioned next to each other to form a wall with a plurality of columns, with each column including one or more item cubbies for receiving items 102. The inventory holders 110 can include a base that can engage with a mobile drive unit 106. For example, one or more mobile drive units 106 can be positioned under the base and pick up one or more inventory holders 110. The mobile drive units 106 can move the inventory holders 110 around the workspace 114. For example, the inventory holders 110 may be moved to a packaging station or a designated area in the workspace 114.

In an illustrative example, a tote filled with items 102 can be received by the item singulation station 112. The item singulation station 112 can remove the items 102 from the tote and position them one at a time on a conveyance mechanism 302. The conveyance mechanism 302 can transport the items 102 to a position for transferring of the items 102 to a mobile sorter 108. The items 102 can be received on a platform and moved up or down to a sorting shelf in the mobile sorter 108. The sorting shelf can receive the one or more items 102. The mobile sorter 108 can be moved by a mobile drive unit 106 from the item singulation station 112 to an inventory holder 110. One or more inventory holders 110 can receive the one or more items 102 from the mobile sorter 108. The items 102 can be received into item cubbies in the inventory holders 110. The inventory holders 110 can be moved around the workspace 114 by mobile drive units 106.

Figure 4:
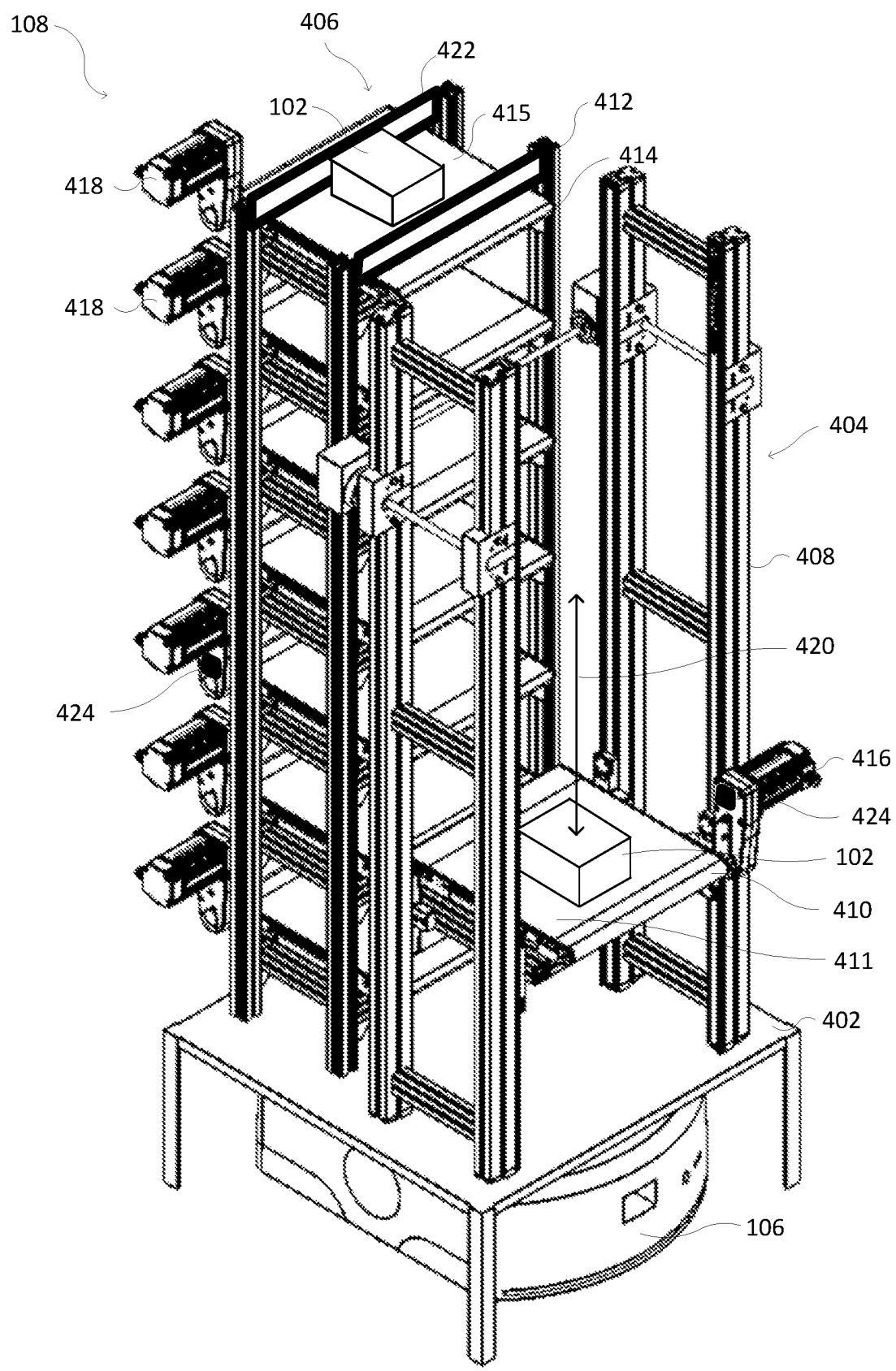
FIG. 4 is an illustration of an example mobile sorter that can be included in particular embodiments of the inventory system of FIG. 1.

FIG. 4 is an illustration of an example mobile sorter 108 that may be utilized in particular embodiments of the system of FIG. 1. The mobile sorter 108 can include a base 402 supporting a platform assembly 404 and a sort assembly 406. The base 402 can include a support surface for attaching the platform assembly 404 and/or the sort assembly 406. The base 402 can include a flat surface for receiving the platform assembly 404 and/or the sort assembly 406. Additionally or alternatively, the base 402 can include mounting features for receiving the platform assembly 404 and/or the sort assembly 406. The base 402 can engage with the mobile drive unit 106. For example, engaging with the base 402 to move the mobile sorter 108 around the workspace 114. In various embodiments, the base can include legs and/or similar elevating features to aid in engaging with the mobile drive unit 106. Additionally or alternatively, the base 402 can include engagement features to engage with the mobile drive unit 106.

In many embodiments, the platform assembly 404 can include a support structure 408 and one or more platforms 410. The support structure 408 can include opposing vertical sidewalls. The vertical sidewalls can be attached to the base 402 and extend upwards to a height. For example, a height of the inventory holders 110. In some embodiments, the support structure 408 can include one or more bracing components to attach the vertical sidewalls together. In further embodiments, the support structure 408 can be or include a shelving unit. The support structure 408 can include engagement and/or mounting features for engaging with the platform 410. The platform 410 can be drivingly coupled with the support structure 408 for movement along the height of the support structure. The platform 410 can move along direction 420 to position the items 102 at a sorting shelf 414. In some embodiments, the platform 410 can be moved along the height of the support structure 408 by a motor 416. However, the platform 410 may be moved along the height of the support structure 408 by a pressure device, an air device, or any suitable device to cause movement of the platform.

In many embodiments the platform 410 can include a platform conveyance surface 411 for receiving one or more items 102. The items 102 can be received from one or more item singulation stations 112 and/or the item can be placed directly on the platform conveyance surface 411. The platform conveyance surface 411 can be or include a conveyor, rollers, and/or a device suitable for positioning the item 102 on the platform 410. For example, an item 102 can be positioned from an edge of the platform 410 to a position at or near the center of the platform using the platform conveyance surface 411. The platform conveyance surface 411 can transfer items 102 from the platform 410. For example, the platform conveyance surface 411 can transfer items 102 from the platform 410 to a sorting shelf 414. In some embodiments, the platform 410 can include a multi-directional platform conveyance surface 411 for movement of the item 102 to a specified position on the platform. For example, the platform conveyance surface 411 may move an item 102 from a position at the center of the front edge of the platform to the center of the right most edge of the platform to receive additional items onto the platform.

The sort assembly 406 can include a frame 412 and one or more sorting shelves 414. The frame 412 can be attached to the base 402 and/or the support structure 408. In some embodiments, the frame 412 and the support structure 408 may be a single component. For example, the frame 412 and support structure 408 can be a shelving unit with sorting shelves 414 defining one or more sorting shelves for receiving items 102. The frame 412 can include one or more engagement and/or attachment points for attaching to and supporting sorting shelves 414. The sorting shelves 414 can be spaced to receive items 102 into an interior area defined by the frame 412. In many embodiments, the frame 412 can be or include a shelving unit.

The sorting shelves 414 can be spaced along the height of the frame 412. For example, the sorting shelves 414 can be evenly spaced along the height of the frame 412. Additionally or alternatively, the sorting shelves 414 can be spaced to include gaps between groups of evenly spaced sorting shelves, or can be spaced at random intervals along the height. For example, the sorting shelves 414 may be spaced with a larger distance between sort sorting shelves to accommodate larger items 102.

In many embodiments, the sorting shelves 414 can include a sorting shelf conveyance surface 415 for receiving the items 102. The sorting shelf conveyance surface 415 can receive the items 102 from platform 410 and move the items 102 from a first side of a sorting shelf 414 to a second side of the sorting shelf. For example, the conveyance surface can receive an item 102 at the front of a sorting shelf 414 and move the item 102 to the back of the sorting shelf for transferring of the item out off of the sorting shelf. The sorting shelf conveyance surface 415 can be or include motor driven rollers, a conveyor belt, or a similar device suitable for conveying items 102. A driving device 418 can be coupled with the sorting shelves 414 and/or the sorting shelf conveyance surface 415 and aid in moving the items 102. For example, items 102 can be moved from the platform 410 to a sorting shelf 414 using the driving device 418. Each of the sorting shelves 414 can include a driving device 418. However, multiple sorting shelves 414 may be driven by the same driving device 418. Additionally or alternatively, one or more sorting shelves 414 may not be driven. The driving device 418 can be or include a motor or similar device to aid in moving the items 102.

In various embodiments, one or more of the sorting shelves 414 and/or the platform 410 can include one or more barriers 422 preventing items 102 from falling. The barriers 422 can be moveable from a first position to a second position. For example, the barriers 422 can be in a first position to allow items 102 onto a sorting shelf 414 and a second position to prevent items from falling off of the sorting shelf 414. The barriers 422 can be positioned at opposing edges of the sorting shelves 414 and/or the platform 410. For example, the barriers 422 can be positioned at a front edge of a sorting shelf 414 and/or at the back edge of the sorting shelf. Additionally or alternatively, barriers 422 may be positioned along the side edges of the sorting shelves 414. The barriers 422 positioned at the side edges of the sorting shelves 414 may guide the items 102 to a position on the sorting shelves 414.

In many embodiments, one or more of the sorting shelves 414 and/or the platform 410 can include one or more sensors 424. For example, sensors 424 can be positioned to detect items 102 positioned on a sorting shelf 414. The sensors 424 can detect, for example, when an item 102 has been received onto or moved off of the sorting shelf. Additionally or alternatively, the sensors 424 can detect where on the sorting shelf 414 the item 102 has been received. Similarly, the sensors 424 can be positioned on the platform 410 to detect when an item 102 has been received onto or removed from the platform and/or where on the platform the item is located. In further embodiments, the sensors 424 can detect data associated with items 102, for example, an items dimensions, an items weight, and/or order data associated with the item. The sensors 424 can be or include, a camera, a scanner, or any device suitable for detecting data associated with the items 102.

In further embodiments, the platform 410 and/or the sorting shelves 414 can include a conveyance device to move the item 102. For example, the platform 410 can include a conveyance device to move items 102 onto and/or off of the platform. As an illustrative example, the platform 410 can include a conveyance device to push items 102 off of the platform and onto a sorting shelf 414. The conveyance device attached to the platform 410 may be used to position items 102 in the sorting shelves 414 and/or move items out of the sorting shelves 414. Additionally or alternatively, the conveyance device may move the items 102 to a position on the platform 410 and/or the sorting shelves 414. The conveyance device can be or include a mechanical manipulator, a robotic arm, a rigid chain, or a similar device suitable for manipulating the items 102. In some embodiments, the conveyance device can be or include sloped surface. For example, the conveyance device can be or include a metal channel with one or more gates for transferring items onto and/or off of the platform 410 and/or the sorting shelves 414.

Figure 5:
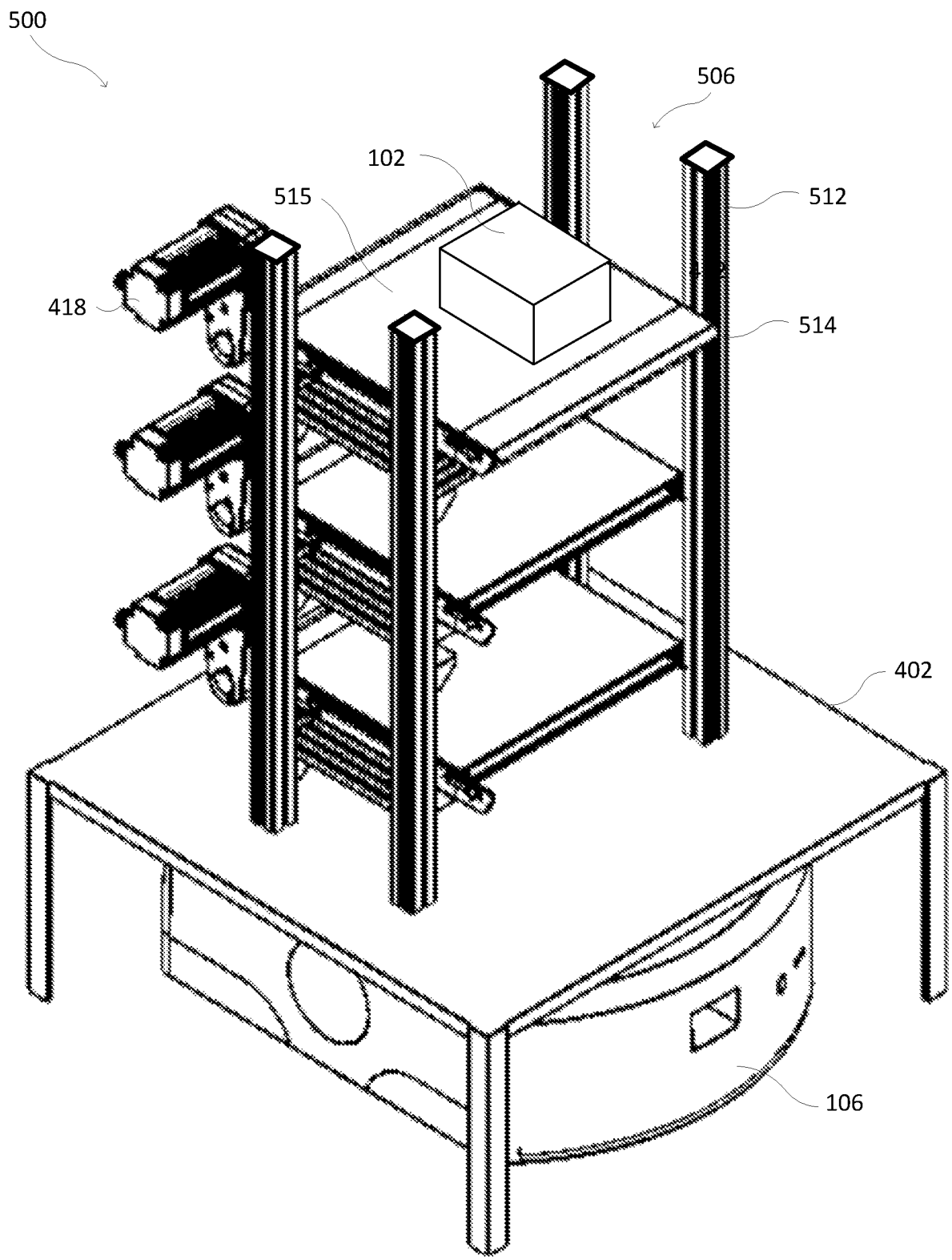
FIG. 5 is an illustration of an additional example mobile sorter that can be included in particular embodiments of the inventory system of FIG. 1.

FIG. 5 is an illustration of an additional example mobile sorter 500 that may be utilized in particular embodiments of the system of FIG. 1. The mobile sorter 500 can include one or more sorting shelves 514 within frame 512. The frame 512 can be mounted to a base 402 engagable with a mobile drive unit 106. The mobile drive unit 106 can be positioned beneath the base 402 to engage with the base and move the base and frame 512 around a workspace 414. However, the frame 512 and/or the base 402 may be mounted directly to the mobile drive unit 106. The sorting shelves 514 can receive one or more items 102 on a conveyance surface 515. The conveyance surface 515 can position the item 102 at a location for transferring of the item to the inventory holders 110. The conveyance surface 515 can be or include rollers, motor driven rollers, a belt, a conveyor, a mechanical pusher, and/or a device suitable for positing an item 102. In some embodiments, the conveyance surface 515 can be attached to a driving device 418 to aid in moving the item 102. For example, the driving device 418 can be a motor driving rollers.

In various embodiments, the frame 512 can include or be attached to a moveable element for moving the sorting shelves 514 up or down. For example, the frame 512 can telescope upwards to position a sorting shelf 514 at a height for receiving and/or depositing an item 102. Additionally or alternatively, the frame 512 can be mounted to an actuator that can move the frame up or down. In various embodiments, the sorting shelves 514 can move relative to the frame for positioning of the sorting shelves at a location for receiving and/or depositing items 102. The mobile sorter 500 can be moved to a location for transferring the item 102 to an inventory holder 110. As an illustrative example, the frame 512 can move to a position for receiving an item 102. The base 402 can be moved to a position adjacent to an inventory holder 110 and the frame 512 can move to a position for depositing the item at a location in the inventory holder 110.

Figure 6:
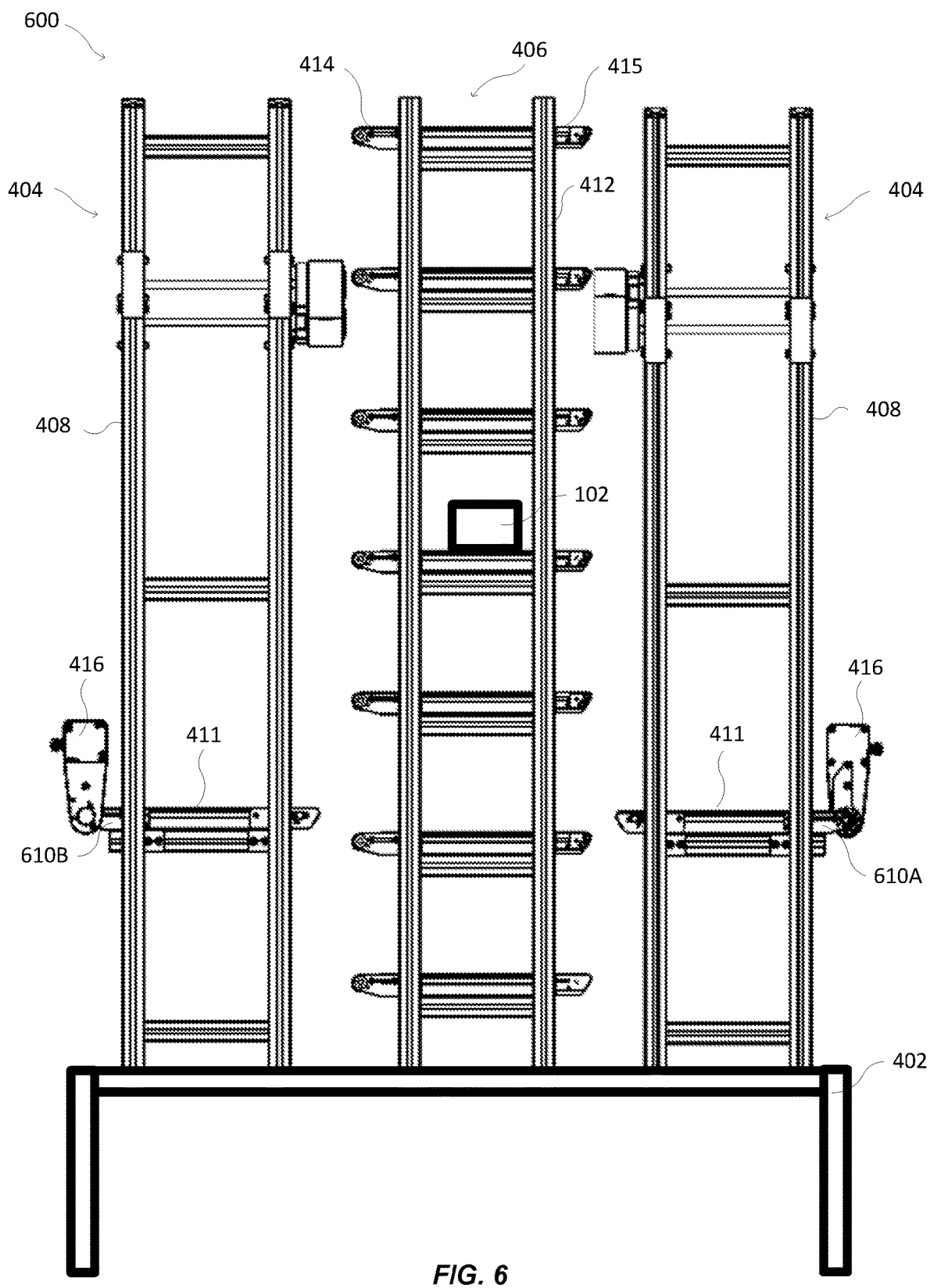
FIG. 6 is an illustration of a further example mobile sorter that can be included in particular embodiments of the inventory system of FIG. 1.

FIG. 6 is another illustration of an example mobile sorter 600 that may be utilized in particular embodiments of the system of FIG. 1. The mobile sorter 600 can include multiple platform assemblies 404 and one or more sort assemblies 406. The platform assemblies 404 and/or the sort assemblies 406 can include some or all of the components described in reference to FIG. 4. However, the platform assemblies 404 and/or sort assemblies 406 may include additional or alternative components. In various embodiments, the mobile sorter 600 can include two platform assemblies 404 with the platform assemblies positioned on opposing sides of the sort assemblies 406. The platform assemblies 404 and the sort assemblies 406 can be mounted to a base 402 which can be engagable with a mobile drive unit 106 for movement of the base around a workspace 114.

The platform assemblies 404 can include a support structure 408 and a platform 610A, 610B. The platform 610A, 610B can move up and down along the height of the support structure 408. The platform 610A, 610B can include a platform conveyance surface 411 and a motor 416. In an illustrative example, the first platform 610A can be positioned at a height to receive an item 102. The platform conveyance surface 411 can receive the item 102 and position the item for movement of the platform 610A and/or movement of the mobile sorter 600. The first platform 610A can move the item 102 up and/or down along the height of the support structure 408 to a sorting shelf 414. The sorting shelf conveyance surface 415 and/or the platform conveyance surface 411 can move the item 102 from the first platform 610A to the sorting shelf 414. The sorting shelf conveyance surface 415 can hold the item 102 in a position while the mobile sorter 106 is moved by the mobile drive unit 106. The mobile sorter 600 can be positioned adjacent to an inventory holder 110. The item 102 can be moved from the sorting shelf 414 to a second platform 610B. The item 102 can be moved to the second platform 610B by the sorting shelf conveyance surface 415 and/or the platform conveyance surface 411. The second platform 610B can move up and/or down along the height of the support structure 408 to receive the item 102. For example, the second platform 610B can move along the height of the support structure 408 to be aligned with the sorting shelf 414. The platform conveyance surface 411 can position the item 102 for transferring of the item. The second platform 610 can move up and/or down along the height of the support structure 408 to position the item 102 for transferring of the item off of the second platform. The platform conveyance surface 411 can move the item 102 off of the second platform 610B, for example, to an item cubby in an inventory bin 110.

FIGS. 7 through 10 illustrate side views of various stages or states in an example of an item sorting process that may be performed by the example mobile sorter 108 of FIG. 4, in accordance with at least one embodiment. Some or all of the stages or states shown in FIGS. 7 through 10 can be controlled by management module 104. For example, the management module 104 can instruct the platform 410 to position the item 102A at a specified sorting shelf 414A. In some embodiments, the management module can instruct the platform 410 to collect multiple items 102 and move up and down the mobile sorter 108 delivering items to one or more sorting shelves 414.

Figure 7:
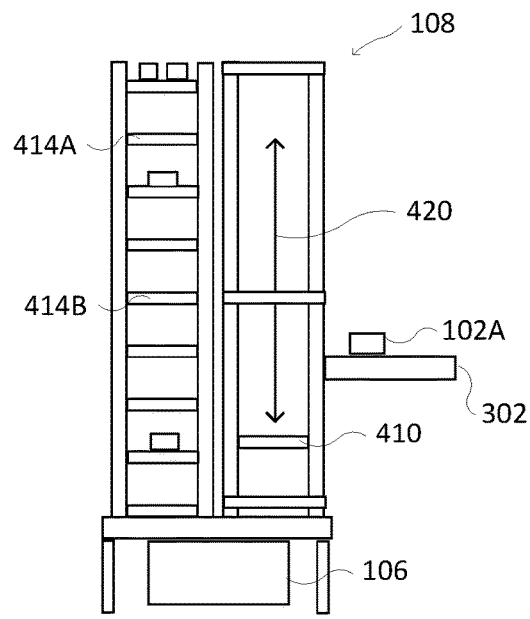
FIGS. 7 through 10 illustrate side views of various stages or states in an example of an item sorting process that may be performed by an example mobile sorter of FIG. 4, in accordance with at least one embodiment.

In FIG. 7, a first item 102A can be positioned next to a mobile sorter 108. The item 102A can be positioned using conveyance mechanism 302. For example, the item 102A can be positioned at the end of the conveyance mechanism 302. The mobile sorter 108 can be positioned next to the conveyance mechanism 302. The mobile sorter 108 can be positioned by mobile drive unit 106. The mobile sorter 108 can be positioned to receive item 102A. Platform 410 can move along the height of the mobile sorter 108 to receive item 102A. For example, platform 410 can move along direction 420 to a position for receiving item 102A. In many embodiments, the platform 410 can move along direction 420 at the same time the mobile drive unit 106 is moving the mobile sorter 108. However, the platform 410 may move after the mobile drive unit 106 has positioned the mobile sorter 108 next to the conveyance mechanism 302.

Figure 8:
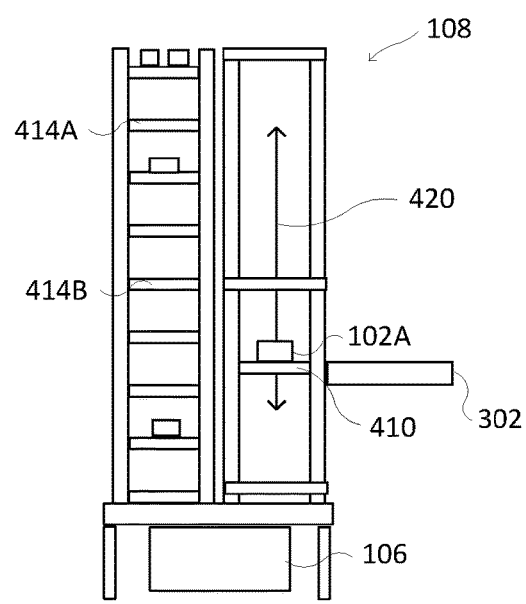

In FIG. 8, the platform 410 can receive item 102A. The management module 104 can position the platform 410 along a height of the mobile sorter 108 for receiving item 102A. For example, the platform 410 can be at the same height or slightly below the height of the conveyance mechanism 302. The platform 410 can position the item 102A on the platform using a conveyance surface. For example, the conveyance mechanism 302 can convey the item 102A until the item is at least partially touching the platform 410 and the conveyance surface can convey the item 102A until the item is centered on the platform. The platform 410 can move the item 102A up or down along direction 420. For example, the conveyance mechanism 302 can be positioned below the top of the mobile sorter 108 and the platform 410 can move the item 102A to a sorting shelf above the conveyance surface. However, the conveyance mechanism 302 may be positioned at a height such that the platform 410 may only position the item 102A by moving either up or down along direction 420.

Figure 9:
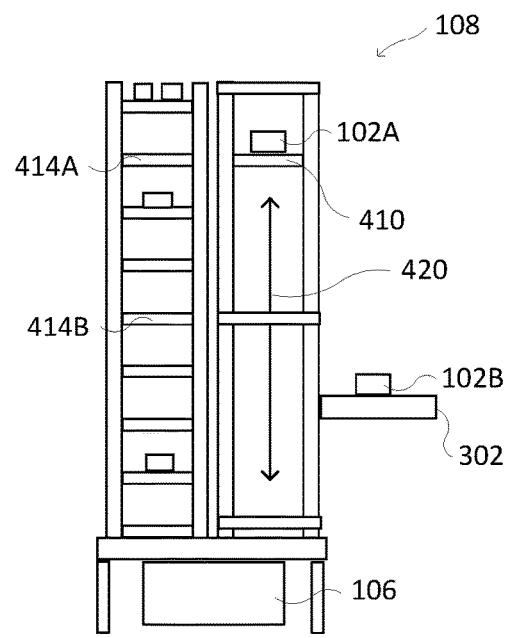

In FIG. 9, the management module 104 can move the platform 410 to position the item 102A at a height corresponding to a sorting shelf 414A. The platform 410 can move along direction 420 to position the item 102A. The item 102A can be positioned slightly above or equal to the sorting shelf 414A. The conveyance surface of the platform 410 can move the item 102A to an edge of the platform 410. The item 102A can be positioned at least partially on the sorting shelf 414A. In many embodiments, the sorting shelf 414A can convey the item 102A to a position where the item is supported by the sorting shelf. In many embodiments, a second item 102B can be conveyed on the conveyance mechanism 302. The second item 102B can be conveyed to the end of the conveyance mechanism 302 to a position for transferring the item to the platform 410.

Figure 10:
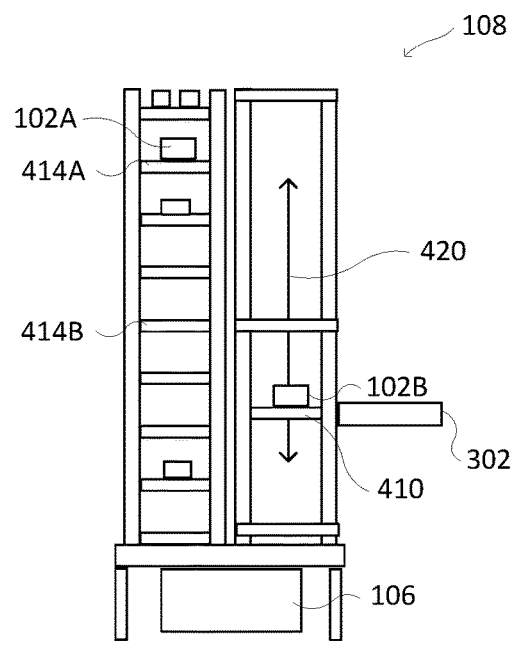

In FIG. 10, the first item 102A can be positioned at a first sorting shelf 414A and the second item 102B can be received on platform 410. The platform 410 can be positioned at a height to receive item 102B. The platform 410 can receive the item 102B from conveyance mechanism 302. However, the platform 410 may receive the item 102B from a different conveyance mechanism and/or the item may be placed on the platform. The platform 410 can position the item 102B at a second sorting shelf 414B. The item 102B can be placed at the second sorting shelf 414B in a manner similar to the manner used to position item 102A at sorting shelf 414A.

In many embodiments, the mobile sorter 108 can be moved by mobile drive unit 106. The mobile sorter 108 can be moved to various positions around workspace 114. For example, the mobile sorter 108 can be moved next to inventory holders 110. In some embodiments, the mobile sorter 108 can be moved to multiple positions in the workspace 114 before the items 102 are removed from the mobile sorter 108.

In various embodiments, the item sorting process may be performed by the example mobile sorter 500 of FIG. 5 and/or the mobile sorter 600 of FIG. 6. For example, the mobile sorter 500 can receive an item 102 into one or more sorting shelves 514. The mobile sorter 500 can move around the workspace 114 and position the item 102 for transferring the item to inventory holders 110. The item 102 can be moved from the sorting shelf 514 to the inventory holder 110. For example, the item 102 can be moved via a conveyance surface. In a further example, the mobile sorter 600 can receive an item 102 on the first mobile platform 610A and move the item to a position for transferring to a sorting shelf 614. The item 102 can be transferred to the sorting shelf 614 and the mobile sorter 600 can be moved to a location for transferring of the item 102 to an inventory holder 110. The item 102 can be moved to a second mobile platform 610B. The second mobile platform 610B can position the item 102 along a height of the mobile sorter 600 for transferring of the item to the inventory holder 110. The second mobile platform 610B can transfer the item to the inventory holder 110, for example, via a conveyance surface.

FIGS. 11 and 12 illustrate two example inventory holders 1100 and 1200, respectively, that can be used with the inventory sorting system 100 of FIG. 1. The inventory holders 1100 and 1200 can be examples of the inventory holder 110 described herein. However, the inventory holders 1100 and 1200 may contain additional and/or alternative components than those described in reference to the inventory holder 110, as described in FIGS. 1 and 2. The inventory holders 1100 and 1200 can include the same or similar components. For example, a discussion of inventory holder 1100 can be applicable to inventory holder 1200 and vice versa. However, the inventory holders 1100 and 1200 may have different components or different designs. The inventory holders 1100 and 1200 can be at least similar to the inventory holders described in U.S. Pat. No. 9,580,245, filed Jun. 10, 2014, and entitled Item-Detecting Overhead Sensor for Inventory System, which is incorporated by reference herein in its entirety.

In FIGS. 11 and 12 only one side of the inventory holders 1100 and 1200 are shown. However, the inventory holders 1100 and 1200 can include multiple sides for receiving items 102. In some embodiments, the sides of the inventory holders 1100 and 1200 can have different numbers of item cubbies 1110 and 1210 respectively. For example, FIG. 9 may represent a first side and FIG. 10 may represent an opposing side. Alternatively, the inventory holders 1100 and 1200 can have the same number of item cubbies, 1110 and 1210 respectively, on more than one side.

In various embodiments, inventory holders 1100 and 1200 can be customized to engage with one or more mobile sorters 108. For example, the inventory holders 1100 and 1200 can include item cubbies 1110, 1210 that can be aligned with the sorting shelves 414 of the mobile sorter 108. The item cubbies 1110, 1210 can receive the items 102 from the sorting shelves 414. Item cubby 1110 can be defined by opposing sidewalls 1112 that are laterally spaced apart from one another to define an opening. Partitions 1114 can span between sidewalls 1112 and be vertically spaced apart from one another to define the item cubbies 1110. The partitions 1114 can be spaced apart along the height of the inventory holder 1100 to correspond to the height of one or more sorting shelves 414. In some embodiments, the a vertical partition 1216 can be included for separating the item cubbies 1210 into two columns. For example, inventory holder 1200 has column A and column B separated by vertical partition 1216. Each column A or B can have similar dimensions to the column A of inventory holder 1100. However, columns A or B can have smaller dimensions than column A of inventory holder 1100, such that, the combined width of columns A and B are similar to the width of column A of inventory holder 1100. In many embodiments, column A of inventory holder 1100 and inventory holder 1200 can have a width corresponding to the width of sorting shelves 414. However, columns A and B of inventory holder 1200 can have a combined width corresponding to the width of sorting shelves 414.

In various embodiments, the item cubbies 1110 can be arranged in a pattern. The pattern can correspond to the pattern of the sorting shelves 414. As an illustrative example, the inventory holder 1100 has a single column, column A, of item cubbies 1110 split into rows I through V defined by partitions 1114. The partitions 1114 can correspond to sorting shelves 414 and can be spaced apart at the same or a similar distance as the spacing of the sorting shelves.

In further embodiments, the height of the rows I through V of inventory holder 1100 can be similar to the height of the sorting shelves 414 of the mobile sorters 108. For example, the partitions 1114 of the inventory holder 1100 can be aligned with the sorting shelves 414, such that, when the mobile sorter 108 is positioned adjacent to the inventory holder 1100 the rows will be aligned. However, the rows of the inventory holder 1100 may be offset from the sorting shelves 414. For example, the rows of the inventory holder 1100 may be positioned at a lower height than the corresponding sorting shelf 414 to allow items to be transferred from the sorting device to the inventory transport.

In some embodiments, the item cubbies 1210 can be arranged to have multiple columns of item cubbies in a single inventory holder 1200. The multiple columns can be created with a physical barrier, for example, vertical partition 1216. However, the multiple columns may be created with a digitally created barrier. The width of the columns of inventory holder 1200 can correspond to the width of the sorting shelves 414. However, the width of the columns of inventory holder 1200 may vary with the width of the columns of sorting shelves 414. For example, the combined width of columns A and B of the inventory holder 1200 can correspond to the width of sorting shelves 414. Additionally or alternatively, the width of column A of the inventory holder 1200 can correspond to the combined width of two mobile sorters 108 positioned side by side.

In further embodiments, the inventory holders 1100 and 1200 can include one or more engagement components for engaging with the mobile sorters 108. For example, inventory holder 1100 can include engagement devices 1118. The engagement device 1118 can engage with a portion of the mobile sorter 108, for example, frame 412. The engagement components can be or include a latch, a notch, a male or female connector, or a treated surface.

The inventory holder 1100 and 1200 can receive one or more items 102 from mobile sorters 108. For example, an item 102 can be received on platform 410 and moved to a sorting shelf 414. Additional items 102 can be positioned on one or more sorting shelves 414 until the mobile sorter 108 is ready to be moved to inventory holders 110. The mobile drive unit 106 can position the mobile sorter 108 adjacent to an inventory holder 110 with one or more of the sorting shelves 414 aligned with an item cubby in the inventory holder 110. One or more of the items 102 positioned on the sorting shelves 414 can be transferred to item cubbies, for example, using sorting shelf conveyance surface 415. In some embodiments, the sorting shelves 414 can be stacked in a column and aligned with a corresponding column of item cubbies in the inventory holder 110. The sorting shelves 414 can transfer the items 102 into the item cubbies at or near the same time. Additionally or alternatively, the platform 410 can receive one or more items 102 from the sorting shelves 414 and align the items with one or more item cubbies in an inventory holder 110 and convey the item to the item cubby. For example, the platform 410 can receive multiple items 102 and convey an item to multiple item cubbies by moving up and down along a height of the mobile sorter 108.

Figure 13:
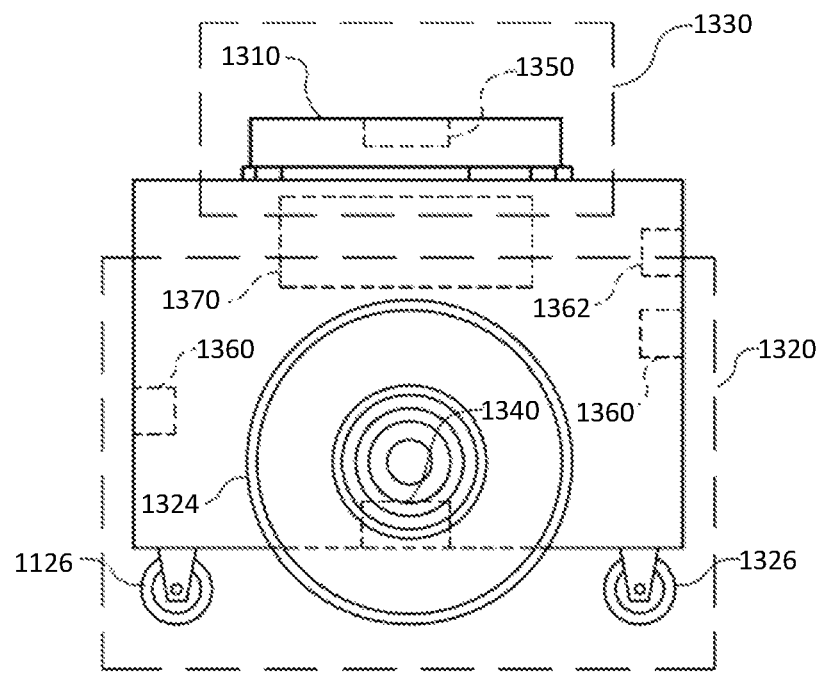
FIGS. 13 and 14 illustrate an example mobile drive unit that may be utilized in particular embodiments of the inventory sorting system of FIG. 1.
Figure 14:
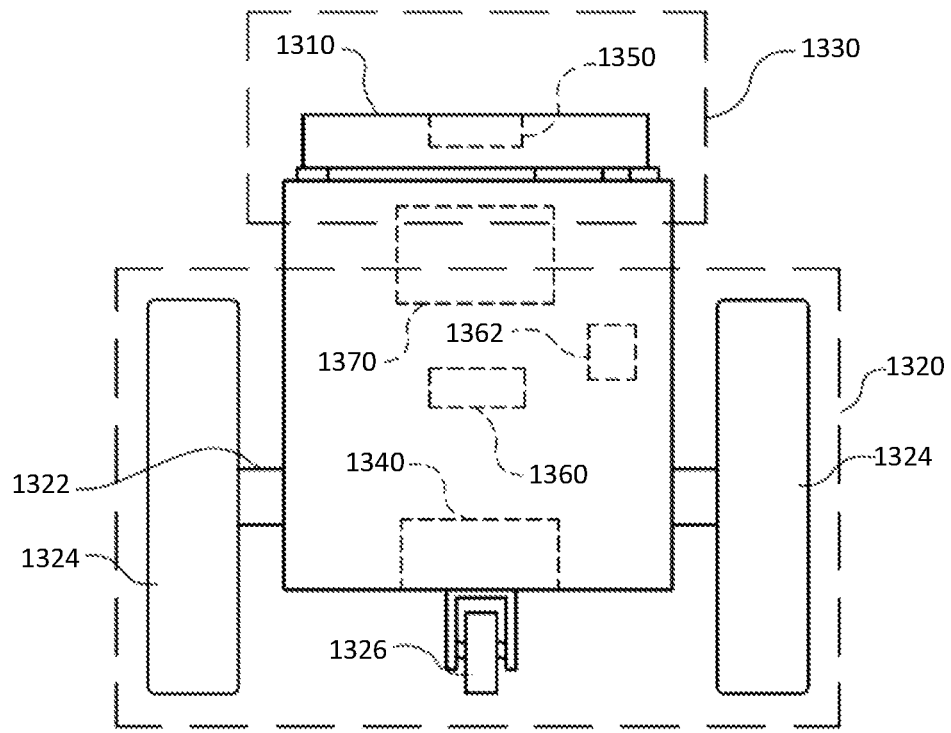

Turning to FIGS. 13 and 14, the components of a particular embodiment of the mobile drive unit 106 is illustrated. In particular, FIGS. 13 and 14 include a front and side view of an example mobile drive unit 106. Mobile drive unit 106 includes a docking head 1310, a drive module 1320, a docking actuator 1330, and a control module 1370. Additionally, mobile drive unit 106 may include one or more sensors configured to detect or determine the location of mobile drive unit 106, mobile sorter 108, inventory holder 110, and/or other appropriate elements of inventory sorting system 100. In the illustrated embodiment, mobile drive unit 106 includes a position sensor 1340, a holder sensor 1350, an obstacle sensor 1360, and an identification signal transmitter 1362.

Docking head 1310, in particular embodiments of mobile drive unit 106, couples mobile drive unit 106 to the mobile sorter 108 and/or inventory holder 110 and/or supports mobile sorter 108 and/or inventory holder 110 when mobile drive unit 106 is docked to the mobile sorter 108 and/or the inventory holder 110. Docking head 1310 may additionally allow mobile drive unit 106 to maneuver the mobile sorter 108 and/or the inventory holder 110, such as by lifting the mobile sorter 108 and/or the inventory holder 110, propelling the mobile sorter 108 and/or the inventory holder 110, rotating the mobile sorter 108 and/or the inventory holder 110, and/or moving the mobile sorter 108 and/or the inventory holder 110 in any other appropriate manner. Docking head 1310 may also include any appropriate combination of components, such as ribs, spikes, and/or corrugations, to facilitate such manipulation of the mobile sorter 108 and/or the inventory holder 110. For example, in particular embodiments, docking head 1310 may include a high-friction portion that abuts a portion of the mobile sorter 108 and/or the inventory holder 110 while mobile drive unit 106 is docked to the mobile sorter 108 and/or the inventory holder 110. In such embodiments, frictional forces created between the high-friction portion of docking head 1310 and a surface of the mobile sorter 108 and/or the inventory holder 110 may induce translational and rotational movement in the mobile sorter 108 and/or the inventory holder 110 when docking head 1310 moves and rotates, respectively. As a result, mobile drive unit 106 may be able to manipulate the mobile sorter 108 and/or the inventory holder 110 by moving or rotating docking head 1310, either independently or as a part of the movement of mobile drive unit 106 as a whole.

Drive module 1320 propels mobile drive unit 106 and, when mobile drive unit 106 and the mobile sorter 108 and/or the inventory holder 110 are docked, the mobile sorter 108 and/or the inventory holder 110. Drive module 1320 may represent any appropriate collection of components operable to propel mobile drive unit 106. For example, in the illustrated embodiment, drive module 1320 includes motorized axle 1322, a pair of motorized wheels 1324, and a pair of stabilizing wheels 1326. One motorized wheel 1324 is located at each end of motorized axle 1322, and one stabilizing wheel 1326 is positioned at each end of mobile drive unit 106.

Docking actuator 130 moves docking head 1310 towards the mobile sorter 108 and/or the inventory holder 110 to facilitate docking of mobile drive unit 106 and the mobile sorter 108 and/or the inventory holder 110. Docking actuator 130 may also be capable of adjusting the position or orientation of docking head 1310 in other suitable manners to facilitate docking. Docking actuator 130 may include any appropriate components, based on the configuration of mobile drive unit 106 and the mobile sorter 108 and/or the inventory holder 110, for moving docking head 1310 or otherwise adjusting the position or orientation of docking head 1310. For example, in the illustrated embodiment, docking actuator 1330 includes a motorized shaft (not shown) attached to the center of docking head 1310. The motorized shaft is operable to lift docking head 1310 as appropriate for docking with the mobile sorter 108 and/or the inventory holder 110.

Drive module 1320 may be configured to propel mobile drive unit 106 in any appropriate manner. For example, in the illustrated embodiment, motorized wheels 1324 are operable to rotate in a first direction to propel mobile drive unit 106 in a forward direction. Motorized wheels 1324 are also operable to rotate in a second direction to propel mobile drive unit 106 in a backward direction. In the illustrated embodiment, drive module 1320 is also configured to rotate mobile drive unit 106 by rotating motorized wheels 1324 in different directions from one another or by rotating motorized wheels 1324 at different speeds from one another.

Position sensor 1340 represents one or more sensors, detectors, or other components suitable for determining the location of mobile drive unit 106 in any appropriate manner. For example, in particular embodiments, the workspace 114 associated with inventory sorting system 100 includes a number of fiducial marks that mark points on a two-dimensional grid that covers all or a portion of workspace 114. In such embodiments, position sensor 1340 may include a camera and suitable image- and/or video-processing components, such as an appropriately-programmed digital signal processor, to allow position sensor 1340 to detect fiducial marks within the camera's field of view. Control module 1370 may store location information that position sensor

1340 updates as position sensor 1340 detects fiducial marks. As a result, position sensor 1340 may utilize fiducial marks to maintain an accurate indication of the location mobile drive unit 106 and to aid in navigation when moving within workspace 114.

Holder sensor 1350 represents one or more sensors, detectors, or other components suitable for detecting inventory holder 30 and/or determining, in any appropriate manner, the location of the mobile sorter 108 and/or the inventory holder 110, as an absolute location or as a position relative to mobile drive unit 106. Holder sensor 1350 may be capable of detecting the location of a particular portion of the mobile sorter 108 and/or the inventory holder 110 or the mobile sorter 108 and/or the inventory holder 110 as a whole. Mobile drive unit 106 may then use the detected information for docking with or otherwise interacting with the mobile sorter 108 and/or the inventory holder 110.

Obstacle sensor 1360 represents one or more sensors capable of detecting objects located in one or more different directions in which mobile drive unit 106 is capable of moving. Obstacle sensor 1360 may utilize any appropriate components and techniques, including optical, radar, sonar, pressure-sensing and/or other types of detection devices appropriate to detect objects located in the direction of travel of mobile drive unit 106. In particular embodiments, obstacle sensor 1360 may transmit information describing objects it detects to control module 1370 to be used by control module 1370 to identify obstacles and to take appropriate remedial actions to prevent mobile drive unit 106 from colliding with obstacles and/or other objects.

Obstacle sensor 1360 may also detect signals transmitted by other mobile drive units 106 operating in the vicinity of the illustrated mobile drive unit 106. For example, in particular embodiments of inventory sorting system 100, one or more mobile drive units 106 may include an identification signal transmitter 1362 that transmits a drive identification signal. The drive identification signal indicates to other mobile drive units 106 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 106.

Additionally, in particular embodiments, obstacle sensor 160 may also be capable of detecting state information transmitted by other mobile drive units 106. For example, in particular embodiments, identification signal transmitter 1362 may be capable of including state information relating to mobile drive unit 106 in the transmitted identification signal. This state information may include, but is not limited to, the position, velocity, direction, and the braking capabilities of the transmitting mobile drive unit 106. In particular embodiments, mobile drive unit 106 may use the state information transmitted by other mobile drive units to avoid collisions when operating in close proximity with those other mobile drive units.

Control module 1370 monitors and/or controls operation of drive module 1320 and docking actuator 1330. Control module 1370 may also receive information from sensors such as position sensor 1340 and holder sensor 1350 and adjust the operation of drive module 1320, docking actuator 1330, and/or other components of mobile drive unit 106 based on this information. Additionally, in particular embodiments, mobile drive unit 106 may be configured to communicate with a management device of inventory sorting system 100 and control module 1370 may receive commands transmitted to mobile drive unit 106 and communicate information back to the management device utilizing appropriate communication components of mobile drive unit 106. Control module 1370 may include any appropriate hardware and/or software suitable to provide the described functionality. In particular embodiments, control module 1370 includes a general-purpose microprocessor programmed to provide the described functionality. Additionally, control module 1370 may include all or portions of docking actuator 1330, drive module 1320, position sensor 1340, and/or holder sensor 1350, and/or share components with any of these elements of mobile drive unit 106.

Moreover, in particular embodiments, control module 1370 may include hardware and software located in components that are physically distinct from the device that houses drive module 1320, docking actuator 1330, and/or the other components of mobile drive unit 106 described above. For example, in particular embodiments, each mobile drive unit 106 operating in inventory sorting system 100 may be associated with a software process (referred to here as a "drive agent") operating on a server that is in communication with the device that houses drive module 1320, docking actuator 1330, and other appropriate components of mobile drive unit 106. This drive agent may be responsible for requesting and receiving tasks, requesting and receiving routes, transmitting state information associated with mobile drive unit 106, and/or otherwise interacting with management module 104 and other components of inventory sorting system 100 on behalf of the device that physically houses drive module 1320, docking actuator 1330, and the other appropriate components of mobile drive unit 106. As a result, for the purposes of this description and the claims that follow, the term "mobile drive unit" includes software and/or hardware, such as agent processes, that provides the described functionality on behalf of mobile drive unit 106 but that may be located in physically distinct devices from the drive module 1320, docking actuator 1330, and/or the other components of mobile drive unit 106 described above.

While FIGS. 13 and 14 illustrate a particular embodiment of mobile drive unit 106 containing certain components and configured to operate in a particular manner, mobile drive unit 106 may represent any appropriate component and/or collection of components configured to transport and/or facilitate the transport of mobile sorters 108 and/or inventory holders 110. As another example, mobile drive unit 106 may represent part of an overhead crane system in which one or more crane assemblies are capable of moving within a network of wires or rails to a position suitable to dock with a particular mobile sorter 108 and/or inventory holder 110. After docking with the mobile sorter 108 and/or inventory holder 110, the crane assembly may then lift inventory the mobile sorter 108 and/or inventory holder 110 and move inventory to another location for purposes of completing an assigned task.

Furthermore, in particular embodiments, mobile drive unit 106 may represent all or a portion of the mobile sorter 108 and/or inventory holder 110. The mobile sorter 108 and/or inventory holder 110 may include motorized wheels or any other components suitable to allow the mobile sorter 108 and/or inventory holder 110 to propel itself. As one specific example, a portion of the mobile sorter 108 and/or inventory holder 110 may be responsive to magnetic fields. Inventory sorting system 100 may be able to generate one or more controlled magnetic fields capable of propelling, maneuvering and/or otherwise controlling the position of the mobile sorter 108 and/or inventory holder 110 as a result of the responsive portion the mobile sorter 108 and/or inventory holder 110. In such embodiments, mobile drive unit 106 may represent the responsive portion of the mobile sorter 108 and/or inventory holder 110 and/or the components of inventory sorting system 100 responsible for generating and controlling these magnetic fields. While this description provides several specific examples, mobile drive unit 106 may, in general, represent any appropriate component and/or collection of components configured to transport and/or facilitate the transport of mobile sorters 108.

Figure 15:
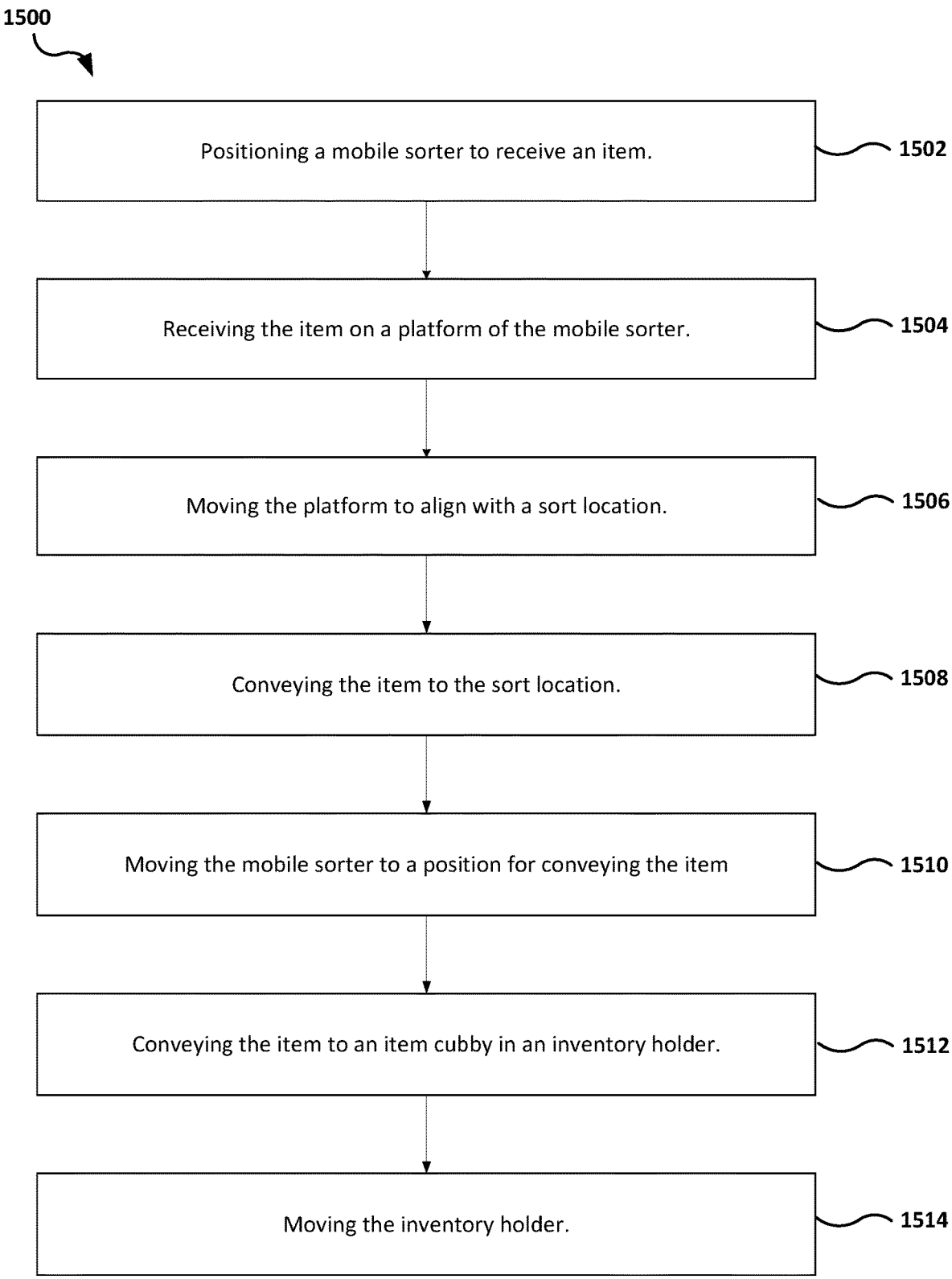
FIG. 15 is a flowchart illustrating a process for transporting inventory for use with the inventory sorting system of FIG. 1, in accordance with at least one embodiment.

Turning to FIG. 15, a flowchart illustrating a process for transporting inventory for use with the inventory sorting system 100 of FIG. 1 is described. Some or all of the process 1500 (or any other processes described herein, or variations, and/or combinations thereof) may be performed under the control of one or more computer system configured with executable instructions and may be implements as code (e.g., executable instructions, one or more computer programs, or one or more applications) executing collectively on one or more processors, by hardware or combinations thereof. For example, the management module 104 can control one or more of the process described herein. The code may be stored on a computer-readable storage medium, for example, in the form of a computer program comprising a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 1500 at 1502 can include positioning a mobile sorter, for example mobile sorter 108, to receive an item, for example item 102. The mobile sorter 108 can be positioned using a mobile drive unit 106. For example, a mobile drive unit 106 can engage with the mobile sorter 108 and move the mobile sorter around workspace 114 to a position for receiving the item 102. In many embodiments, the item 102 can be moved to a position for transferring of the item to the mobile sorter 108 by an item singulation station 112. The item singulation station 112 can position one item for transferring to the mobile sorter 108. However, the item singulation station 112 may position multiple items for transferring to the mobile sorter 108.

The process 1500 at 1504 can include receiving the item 102 on a platform, for example platform 410, of the mobile sorter 108. The platform 410 can receive the item 102 and position the item on the platform using one or more conveyance mechanisms. For example, the item 102 can be received onto the platform 410 and the platform can position the item at or near the center of the platform. The platform 410 can be received from the item singulation station 112. However, the item 102 may be placed directly on the platform 410.

The process 1500 at 1506 can include moving the platform 410 to align with a sorting shelf, for example, sorting shelf 414. The platform 410 can move along the height of the mobile sorter 108. For example, the platform 410 can receive the item 102 at a first position and move up or down along the height of the mobile sorter 108 to a second position. The sorting shelf 414 can include a receiving surface for aligning with the platform 410. The platform 410 can move to a position where the platform is aligned with the receiving surface to transfer the item 102.

The process 1500 at 1508 can include conveying the item 102 to the sorting shelf 414. The sorting shelf 414 can receive the item 102 on a receiving surface. The receiving surface can include one or more conveyance mechanisms for positioning the item 102 on the receiving surface. For example, the sorting shelf 414 can include a conveyor for positioning the item 102 at or near the center of the receiving surface.

The process 1500 at 1510 can include moving the mobile sorter 108 to a position for conveying the item 102. The mobile sorter 108 can be moved using the mobile drive unit 106. The mobile sorter 108 can be moved around the workspace 114 to a position for conveying the item 102. For example, the mobile sorter 108 can be moved to a position for conveying the item 102 into an inventory holder 110. In many embodiments, the mobile sorter 108 can be moved to multiple positions before being moved to a position for conveying the item 102.

The process 1500 at 1512 can include conveying the item to an item cubby, for example item cubby 1110, 1210, in an inventory holder, for example inventory holder 110. The item cubby 1110, 1210 can be or include a surface for receiving the item 102 and one or more partitions for separating items from other item cubbies. One or more storage locations can be included in an inventory holder 110. The item cubby 1110, 1210 can be aligned with the sorting shelf 414 for conveyance of the items 102 to the item cubby. The item 102 can be conveyed to the item cubby 1110, 1210 using one or more conveyance mechanisms. For example, a conveyor connected to the sorting shelf 414 can convey the item 102 to the item cubby 1110, 1210.

The process 1500 at 1514 can include moving the inventory holder 110. The inventory holder 110 can be moved around the workspace 114. The inventory holder 110 can be moved using mobile drive unit 106. The mobile drive unit 106 can engage with and move the inventory holder 110 for further processing of the item 102. For example, the inventory holder 110 can be moved to a location for removal of the item 102.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A mobile sorting unit, comprising:
 a shelving unit coupled with a support platform comprising a support surface and a plurality of support legs, the shelving unit comprising:
  a plurality of shelves in an interior of the shelving unit, the plurality of shelves spanning between vertical support structures and spaced apart along a height of the vertical support structures;
  an indexing platform extending between and drivingly coupled with the vertical support structures and moveable up or down along the height of the shelving unit, the indexing platform configured to align with a shelf selected from the plurality of shelves; and
 a drive unit engagable with the support surface.

2. The mobile sorting unit of claim 1, wherein the drive unit is configured to engage with the support platform and move the support platform and the shelving unit.

3. The mobile sorting unit of claim 1, wherein the indexing platform comprises a first conveyance mechanism and the shelf comprises a second conveyance mechanism.

4. The mobile sorting unit of claim 3, wherein the first conveyance mechanism is configured to convey a first item positioned on the indexing platform off of the indexing platform and the second conveyance mechanism is configured to convey a second item positioned on the shelf off of the shelf.

5. The mobile sorting unit of claim 3, wherein the first conveyance mechanism or the second conveyance mechanism comprises motor driven rollers, belted rollers, or a mechanical pushing device.

6. The mobile sorting unit of claim 1, wherein the shelving unit further comprises a motor coupled with the indexing platform and configured to cause movement of the indexing platform along the height of the shelving unit.

7. A sorting device comprising:
 an indexing platform drivingly coupled with a support structure and moveable up or down along a height of the support structure, the indexing platform configured to receive an item and position the item along the height of the support structure for transferring of the item from the indexing platform; and
 a base coupled with the support structure and comprising a first surface engaged with the support structure and a second surface opposing the first surface and engagable with a mobile drive unit.

8. The sorting device of claim 7, wherein the support structure comprises a plurality of storage locations defined by a plurality of shelves spanning between vertical supports and spaced apart along a height of the vertical supports.

9. The sorting device of claim 8, wherein the sorting device further comprises one or more sensors coupled with the support structure and configured to detect data associated with the item.

10. The sorting device of claim 8, wherein a storage location of the plurality of storage locations comprises a conveyance mechanism.

11. The sorting device of claim 10, wherein the conveyance mechanism is configured to convey the item into and out of the storage location of the plurality of storage locations.

12. The sorting device of claim 10, wherein the storage location is alignable with an item cubby and the conveyance mechanism is configured to convey the item into the item cubby.

13. The sorting device of claim 7, wherein the indexing platform comprises a conveyance mechanism configured to convey the item from the indexing platform.

14. The sorting device of claim 7, wherein the base comprises a plurality of legs defining one or more openings through which the mobile drive unit can enter to engage the second surface.

15. The sorting device of claim 7, further comprising a propulsion system coupled with the base and configured to move the base and the a plurality of legs defining one or more openings through which the mobile drive unit can enter to engage the second surface.

16. A mobile sorting apparatus, comprising:
 a shelving unit comprising:
  a plurality of shelves in an interior of the shelving unit, the plurality of shelves spanning between vertical support structures and spaced apart along a height of the vertical support structures;
  an indexing platform extending between and drivingly coupled with the vertical support structures and moveable up or down along the height of the shelving unit; and
 a support platform coupled with the shelving unit and comprising:
  a first surface configured to engage the shelving unit; and
  a plurality of support legs coupled with a second surface opposing the first surface, the plurality of support legs spaced apart to define one or more openings for receiving a mobile drive unit engagable with the second surface.

17. The mobile sorting apparatus of claim 16, wherein the indexing platform is configured to receive an item and align the indexing platform with a shelf of the plurality of shelves to convey the item to the shelf.

18. The mobile sorting apparatus of claim 16, wherein the indexing platform comprises a conveyance mechanism configured to transfer an item from the indexing platform to a shelf of the plurality of shelves aligned with the indexing platform.

19. The mobile sorting apparatus of claim 16, wherein the mobile drive unit is configured to engage with the second surface and position the shelving unit aligning a shelf of the plurality of shelves with an item cubby.

20. The mobile sorting apparatus of claim 19, wherein the shelf comprises a conveyance mechanism configured to convey an item from the shelf to the item cubby.

* * * * *